United States Patent
Varadi et al.

(10) Patent No.: US 10,108,154 B2
(45) Date of Patent: Oct. 23, 2018

(54) INFLUENCE LEARNING FOR MANAGING PHYSICAL CONDITIONS OF AN ENVIRONMENTALLY CONTROLLED SPACE BY UTILIZING A CALIBRATION OVERRIDE WHICH CONSTRAINS AN ACTUATOR TO A TRAJECTORY

(71) Applicant: VIGILENT CORPORATION, El Cerrito, CA (US)

(72) Inventors: Peter Christian Varadi, El Cerrito, CA (US); Jerry Chin, Mountain View, CA (US); Steven David Horowitz, San Francisco, CA (US); Clifford Federspiel, El Cerrito, CA (US)

(73) Assignee: VIGILENT CORPORATION, El Cerrito, CA (US)

( * ) Notice: Subject to any disclaimer, the term of this patent is extended or adjusted under 35 U.S.C. 154(b) by 613 days.

(21) Appl. No.: 14/273,072

(22) Filed: May 8, 2014

(65) Prior Publication Data
US 2014/0337256 A1 Nov. 13, 2014

Related U.S. Application Data

(60) Provisional application No. 61/820,963, filed on May 8, 2013.

(51) Int. Cl.
*G05B 13/04* (2006.01)

(52) U.S. Cl.
CPC ...... *G05B 13/04* (2013.01); *G05B 2219/2642* (2013.01); *Y02P 80/114* (2015.11); *Y02P 90/86* (2015.11)

(58) Field of Classification Search
None
See application file for complete search history.

(56) References Cited

U.S. PATENT DOCUMENTS 4,873,649 A * 10/1989 Grald .................. F24F 11/0009
62/176.6
5,170,935 A 12/1992 Federspiel et al.
(Continued)

FOREIGN PATENT DOCUMENTS

EP 0501432 9/1994
JP 2005-231693 A 9/1993
(Continued)

OTHER PUBLICATIONS

Wang et al. Supervisory and Optimal Control of Building HVAC Systems: A Review. HVAC&R RESEARCH. vol. 14, No. 1. Jan. 2008.*
(Continued)

*Primary Examiner* — Robert A Cassity
*Assistant Examiner* — Robert Bejcek, II
(74) *Attorney, Agent, or Firm* — Kilpatrick Townsend & Stockton LLP

(57) ABSTRACT

Systems and methods are described for updating an influence model used to manage physical conditions of an environmentally controlled space. A method comprises operating an environmental maintenance system in a first production mode with the influence model until an event causes the system to enter a second production mode. In the second production mode a first actuator's operation level is varied and operation levels of other actuators are optimized. The influence model is adjusted based on the operation levels.

20 Claims, 15 Drawing Sheets

(56) References Cited

U.S. PATENT DOCUMENTS

| | | |
|---|---|---|
| 5,464,369 A | 11/1995 | Federspiel |
| 5,477,444 A * | 12/1995 | Bhat .................... B01D 3/425 700/48 |
| 5,550,752 A | 8/1996 | Federspiel |
| 5,768,121 A | 6/1998 | Federspiel |
| 5,862,982 A | 1/1999 | Federspiel |
| 5,875,109 A | 2/1999 | Federspiel |
| 5,920,478 A | 7/1999 | Ekblad et al. |
| 6,101,459 A | 8/2000 | Tavallaei et al. |
| 6,402,043 B1 | 6/2002 | Cockerill |
| 6,470,230 B1 | 10/2002 | Toprac et al. |
| 6,557,574 B2 | 5/2003 | Federspiel |
| 6,719,625 B2 | 4/2004 | Federspiel |
| 6,865,449 B2 | 3/2005 | Dudley |
| 7,058,477 B1 | 6/2006 | Rosen |
| 7,089,087 B2 | 8/2006 | Dudley |
| 7,097,111 B2 | 8/2006 | Riley et al. |
| 7,117,129 B1 | 10/2006 | Bash et al. |
| 7,363,094 B2 | 4/2008 | Kumar |
| 7,664,573 B2 | 2/2010 | Ahmed |
| 7,676,280 B1 | 3/2010 | Bash et al. |
| 7,839,275 B2 | 11/2010 | Spalink et al. |
| 7,847,681 B2 | 12/2010 | Singhal et al. |
| 7,890,215 B2 | 2/2011 | Duncan |
| 7,894,943 B2 | 2/2011 | Sloup et al. |
| 8,126,574 B2 | 2/2012 | Discenzo et al. |
| 8,224,489 B2 | 7/2012 | Federspiel |
| 8,255,085 B2 | 8/2012 | Salsbury |
| 8,374,731 B1 | 2/2013 | Sullivan |
| 8,924,026 B2 | 12/2014 | Federspiel |
| 2002/0020446 A1 | 2/2002 | Federspiel |
| 2003/0064676 A1 | 4/2003 | Federspiel |
| 2003/0067745 A1 | 4/2003 | Patel et al. |
| 2003/0200050 A1 | 10/2003 | Sharma |
| 2004/0065097 A1 | 4/2004 | Bash et al. |
| 2005/0096789 A1 | 5/2005 | Sharma et al. |
| 2006/0116067 A1 | 6/2006 | Federspiel |
| 2006/0206291 A1 | 9/2006 | Bash et al. |
| 2006/0234621 A1 | 10/2006 | Desrochers et al. |
| 2007/0089446 A1 | 4/2007 | Larson et al. |
| 2009/0271150 A1 | 10/2009 | Stluka et al. |
| 2011/0161059 A1 | 6/2011 | Jain et al. |
| 2011/0203785 A1 * | 8/2011 | Federspiel ............. G05D 22/02 165/200 |
| 2012/0101646 A1 | 4/2012 | Federspiel |
| 2012/0101648 A1 * | 4/2012 | Federspiel ......... G05D 23/1934 700/291 |

FOREIGN PATENT DOCUMENTS

| | | |
|---|---|---|
| JP | 2006-323595 A | 11/1994 |
| WO | 95/01592 A1 | 1/1995 |
| WO | 2006/099337 | 9/2006 |

OTHER PUBLICATIONS

Zavala, Victor M. Real-Time Resolution of Conflicting Objectives in Building Energy Management: An Utopia-Tracking Approach. ANL/MCS-P2056-0312. 2012. 9 pages.*

International Search Report and Written Opinion dated Sep. 25, 2009 in PCT/US2009/035905, 10 pages.

International Search Report and Written Opinion dated Oct. 20, 2010 in PCT/US2010/046228, 13 pages.

Written Opinion dated Feb. 14, 2013 in Singaporean Patent Application No. 201201144-1, 10 pages.

Extended European Search Report received in European Patent Application No. 14794200.7; 5 pages.

International Search Report and Written Opinion dated Mar. 27, 2012 in PCT/US2011/048677, 10 pages.

* cited by examiner

All Cases:

Location of Optimal Solution: ●

Direction of Increasing Contour Values: ⟶

INFLUENCE LEARNING FOR MANAGING PHYSICAL CONDITIONS OF AN ENVIRONMENTALLY CONTROLLED SPACE BY UTILIZING A CALIBRATION OVERRIDE WHICH CONSTRAINS AN ACTUATOR TO A TRAJECTORY

CROSS-REFERENCES TO RELATED APPLICATIONS

The present application claims benefit under 35 USC 119(e) of U.S. Provisional Application No. 61/820,963, filed on May 8, 2013, and entitled "INFLUENCE LEARNING IN AN ENVIRONMENTALLY MANAGED SYSTEM," of which the entire disclosure is incorporated herein by reference for all purposes.

The present application is also related to commonly owned non-provisional applications:

Ser. No. 13/215,189 entitled "ENERGY-OPTIMAL CONTROL DECISIONS FOR SYSTEMS" by Federspiel et al. filed Aug. 22, 2011;

Ser. No. 12/860,820 entitled "Method And Apparatus For Efficiently Coordinating Data Center Cooling Units" by Federspiel et al. filed Aug. 20, 2010; and Ser. No. 12/396,944 entitled "Method and Apparatus for Coordinating the Control of HVAC Units" by C. Federspiel filed Mar. 3, 2009, the entire contents of which are herein incorporated by reference for all purposes.

BACKGROUND

There are many situations in which values of a physical condition, such as temperature and humidity, of a space need to be controlled. Two specific examples are offices where humans work and computer rooms of data centers that contain large arrays of computers and servers. To control the physical conditions, the space is provided with devices, termed environmental maintenance modules, or just modules, capable of modifying one or more of the physical conditions. The modules have one or more adjustable components termed environmental actuators, or just actuators, which control how the modules operate.

Manufacturers typically provide environmental maintenance modules as integral units with built-in controllers and externally accessible and/or adjustable set points for the actuators. These modules are installed in the space to be environmentally controlled, or are at least are functionally connected to that space, for example by ductwork. The set points are selected by an administrator (such as personnel, the data center operations personnel, administrator, owner, decision maker, equipment installer, or similar) to best maintain desired environmental conditions in the managed space. Often there is no communication between the environmental actuators and the environmental sensors in the environmental space to coordinate the actions of all actuators.

A purpose of a supervisory controller is to communicate with many and preferably all environmental actuators and sensors in the environmentally controlled space and to coordinate the actions of all environmental actuators in order to improve overall system performance compared to a system that has no such coordination. A supervisory controller has the potential to improve system responsiveness to critical environmental conditions, to reduce the total power consumption of all environmental actuators, to better manage system wear and tear, and other advantages.

However, the initialization and update of a model used by the supervisory controller for a particular application can be problematic. For example, a model initialization procedure may be time consuming and may need to be done before the system is working. This makes retrofitting a supervisory controller into an environmental management system difficult. Also, if the environmentally controlled space is updated, such as by adding or moving equipment, the model will need to be updated to be accurate.

BRIEF SUMMARY

Embodiments of the invention are directed to updating an influence model for a supervisory controller of an environmental maintenance system. The environmental maintenance system may comprise at least a plurality of sensors measuring respective physical conditions such as temperature, pressure or humidity of a space. The system may further comprise a plurality of environmental maintenance modules such as air conditions, humidifiers/dehumidifiers, or other devices capable of modifying the physical conditions. The values measured by the sensors may be used by the supervisory controller to adjust operation levels of actuators within the modules.

The update can be performed while the system is maintaining the environment within a prescribed range (e.g., in a temperature range). For example, a predetermined function, or trajectory, can specify how inputs to the actuators are changed so that new behavior (e.g., initial behavior) of the system can be explored and included in the influence model, while monitoring the sensors. Without the need of a separate initialization and/or model update processes, costs, installation and run times can be reduced.

Embodiments include methods of updating an influence model comprising running the environmental maintenance system in a first production mode until an event is identified that shows the system has entered a second production mode. In the first production mode the system may operate by measuring the sensor values and determining operation levels of actuators by minimizing a first cost function and predicting sensor values that may result from the operation levels. The operation levels may be constrained so as not to exceed a threshold.

The event that identifies the system's entry into the second production mode may be an automatically scheduled event, a detected degradation in the performance of the influence model or an administrator initiated event. In the second production mode the system can operate to update (e.g., as part of initialization) the influence model. This is accomplished by determining a first actuator whose operation level is to be varied. The variation in the operation level may be along a chosen trajectory, and may cause the operation level to attain a value that the influence model would not cause it to attain in the first production mode. During the variation of the operation levels of the first actuator, the supervisory controller may then operate to adjust operation levels of the other actuators so as to maintain the physical conditions of the space within desired limits.

As a result of the observed operation levels of the actuators as the first actuator is varied along the trajectory, parameters of the influence model for the space can be initialized or updated. As a result an improved set of operation levels for the actuators may be determined, for example to reduce power consumption.

Confidence scores of the influence model associated with at least one actuator can be determined and compared to a threshold. The existence of a score below a threshold may serve as an event to cause the system to enter the second production mode.

Further, predictions of sensor values for a particular time can be made using recorded actual sensor and actuator operation levels from previous times, comparing the predicted sensor values to the observed sensor values for the particular time, and updating the influence model on the basis of the comparison. The update may involve modifying parameters of the influence model using a least squares technique. The second production mode can be exited in case of undesired values of the physical conditions of the space are observed.

Other embodiments are directed to systems and computer readable media associated with methods described herein.

Definitions

As used herein, an environmental management system comprises environmental sensors (such as temperature, humidity, pressure, etc.) and environmental maintenance modules (such as air handling units (AHUs), air conditioners (AC), etc.). A typical example of an environmentally managed system is a data center computer room. There, temperature sensors monitor the air temperature at the air intake of computing equipment. Computer Room Air Conditioners (CRACs) circulate refrigerated air to the computing equipment and heated air back from that equipment to be cooled again by the CRACs.

The terms 'AHU' or 'CRAC' may sometimes be used herein to mean any 'environmental maintenance module' capable of modifying a physical condition of an environment, unless attention is drawn to a specific feature or property of a particular type of environmental maintenance equipment.

Each environmental maintenance module can comprise active actuators such as fans, valves, pumps, etc. that are controlled by a module controller and module controller set points. A module controller is configured to operate its active components in a manner that tracks these set points. The term 'set point' as used herein includes various levels of control over the actuator. For example, a 'set point' can be a direct command to an actuator component, such as fan speed, or an on/off command. In general though, a set point may involve the interaction of several actuator components for tracking. For example, in order for a CRAC to track a discharge air temperature set point, the CRAC controller measures the temperature of its discharge air and, depending on the deviation from the current set point, adjust the speed of its direct expansion compressor(s) and/or fan(s) to increase or decrease the cooling output.

DETAILED DESCRIPTION

Figure 1:
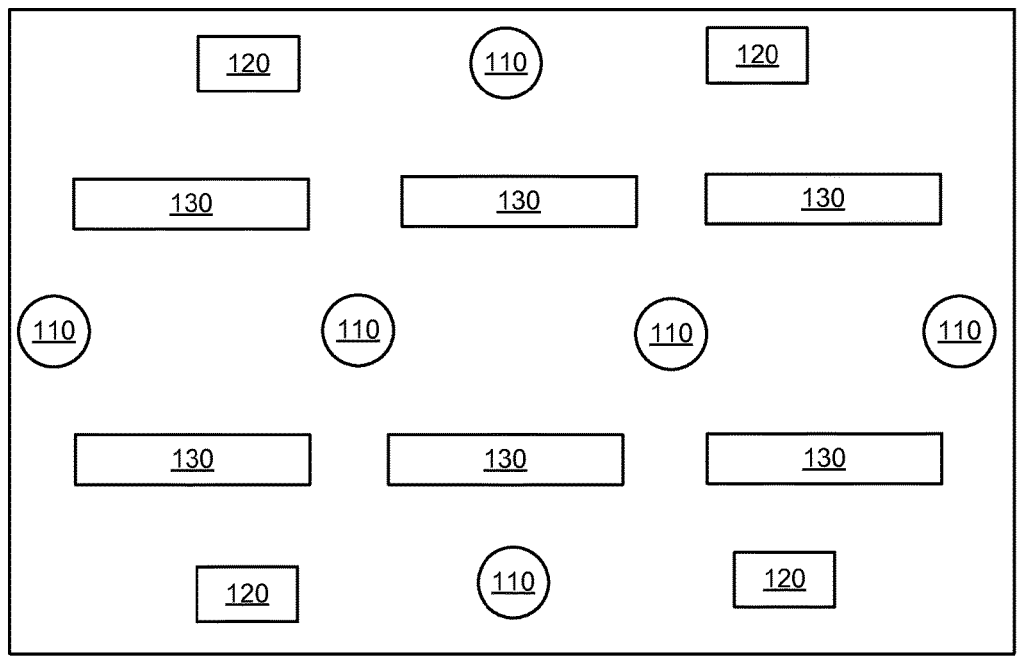
FIG. 1 illustrates an exemplary floor plan of a server room, according to an embodiment of the present invention.

Embodiments of the invention are concerned with supervisory controllers for environmental management system, or just 'supervisory controllers', that use, maintain and update an influence model, or simply a 'model', to control physical conditions of the environmentally managed space. The second section of this description provides a general explanation and examples of such environmental management systems and particular cases. The third section discloses embodiments that use a supervisory controller in an environmental management system, and for updating an influence model used by the supervisory controller.

I. Overview of Environmental Management Systems

A. General Considerations

Often enclosed physical spaces need to have values of various physical conditions maintained within certain desired ranges of values. Examples of such spaces include individual rooms, entire floors of an office building and computer server rooms at data centers. Examples of such physical conditions include temperature, pressure and humidity. The role of an environmental management system is to provide the operational control of one or more environmental maintenance modules that operate to maintain the physical conditions. The modules have various adjustable components, such as fan speeds or valve settings, that function to affect the physical conditions. These components are controlled by values of actuators, for example, a voltage setting on a fan or a turn setting on a valve. A goal of an environmental management system is to maintain physical conditions of environmentally controlled space within the desired ranges by finding an effective combination of values of the actuators. A further goal is find the most efficient such combination. There may also be other goals for the system.

The modules of a system may be controlled in a variety of ways. A first control method is complete manual control by an administrator. While this method may be effective for systems with a small number of modules and sensors, it is unlikely to work effectively and efficiently for large scale systems, as is often the case. A second system control method has the modules work autonomously under the control only of an onboard controller for its own actuators. For example, a single office room with only one temperature sensor and one AHU can have a simple on/off control algorithm determined by the room's temperature. Larger scale systems comprising multiple sensors and modules may also be implemented to run with each module autonomously responding to the values one or more sensors. Such systems may be effective but are unlikely to be efficient.

Greater efficiency can be achieved for systems, especially for large scale systems with multiple sensors and modules, through the use of one or more supervisory controllers, which can adjust settings of actuators on multiple modules based on the values from multiple sensors. An adjustable setting of an actuator is termed a 'control variable.' Examples of control variables include fan voltages and valve settings; the term 'actuator value' is used herein to refer to specific values of control variables. Actuator values may include Boolean values, including 'on' or 'off', real number values, hexadecimal values, percent of a possible range (e.g. 50% for valve opening) or other forms of data values. When it is clear from context, the terms 'control variable' and 'actuator value' may be used interchangeably. The supervisory controller (e.g., via a computer subsystem) can be communicatively linked with some or all of the sensors and modules. Supervisory controllers can use processes that account for the interrelated effects caused by changing multiple actuator values, especially over multiple modules. The supervisory controllers can also use one or more methods to compensate for changed functionality of various modules, such as a non-operational status due to maintenance or mechanical failure.

Supervisory controllers may be implemented through programs implemented on a general purpose computer, a microcomputer or a microcontroller. Supervisory controllers may also be implemented directly in hardware or firmware, for example on an application specific integrated circuit (ASIC) or a field programmable gate array (FPGA). Supervisory controllers may also be configured with a user interface (UI) through which an administrator can update or override the control processes being used. Other ways of implementing a supervisory controller are known to those of skill in the art.

The methods and information about the space, sensors and modules that are used by supervisory controllers to maintain the physical conditions of the space are generally termed an influence model, or just a model. For example, in the simple case of a single temperature sensor for a single AHU of a room, the influence model could be an algorithm for predicting if air conditioning 'on' will lower the temperature below a certain preset value, and if turning it 'off' would cause the temperature to exceed that value. Clearly, for large scale systems more complex influence models are needed to achieve effectiveness and efficiency.

The influence model used by the supervisory controller expresses in mathematical terms how values of actuators of environmental maintenance modules, or changes therein, affect the values of the environmental sensors at locations where environmental sensors are located and in other locations of the environmentally managed space. The model also takes into account known inputs or design parameters that affect how the environmental sensors respond. For example, outdoor temperature or IT Load in a data center may be such inputs. An influence model should have predictive qualities; it should be able to predict with some level of confidence what influence a set point change on an environmental actuator has on an environmental sensor at some time after the set point change has occurred. Models can obtained in several ways combining analytical and experimental methods.

One way to obtain such an influence model may be based on linear control theory. In this embodiment a transfer matrix G relates control input values to output sensor values. For input control variables $\vec{C}^u$, the model predicts the output sensor values to be $\vec{V} = G\vec{C}^u$. An alternate implementation has the transfer matrix G predict changes in the sensor values about a current operating point that result from changes in the input control variables: $\Delta\vec{V} = G\Delta\vec{C}^u$. The input control variables may include internal system variables as well as set point values for the actuators.

To use such a linear model the coefficients of the matrix G are determined. One method to determine G may be to use a time-consuming and expensive computational fluid dynamics simulation. In another method, G may be determined during system installation. The control inputs are sequentially varied and observed changes in the sensor values are observed.

As would be known to one of skill in the art, other ways of creating an influence model and implementing control of an environmental maintenance system by a supervisory controller also exist. For example, influence models and procedures based on heuristics and/or fuzzy logic control exist. Such other methods of control and development of influence models may be used in conjunction with linear control theory.

The supervisory controller uses the influence model to make control decisions. For example, if a sensor measures values that exceed a preset threshold, the supervisory controller would optimally pick one or more of the most influential environmental actuators to address the problem in the most effective way, other choices being less effective or ineffective.

In practice, an environmentally managed space is expected to change over time both structurally and non-structurally. For example, in a data center fluctuations in the heat produced by the computing equipment due to increased computational needs is a non-structural change, whereas moving, adding, or removing computing equipment is a structural change. Such changes may render an initial influence model successively less accurate and less relevant. A model-based controller therefore needs to regularly update its model of the environmentally managed space.

B. Example System

These general considerations of an environmentally managed space controlled by an environmental management system using a supervisory controller may be well illustrated by a computer server room of a data center with a floor plan as shown in FIG. 1. Particular cases discussed below illustrate instances by which influence models can be developed and modified, and illustrate deficiencies therein which may be overcome by embodiments of the invention.

The space of the computer room contains server racks 130, which typically generate significant heat. However, excess heat can lead to failure of a server, so the space should have, at least, its temperature maintained within desired limits. Other physical conditions that may need to be controlled include the air pressure in the room, dust levels and humidity levels.

The computer server room of FIG. 1 may be a raised floor computer room. In such an example the computing equipment comprises servers that are vertically arranged in racks 130 on top of the raised floor. The racks are arranged side by side in parallel rows. Aisles separate these rows of racks. Racks have a cold side facing a cold aisle and a hot side facing a hot aisle. Most computing equipment draws cool air from a cold aisle and expels heated air to a hot aisle.

The environmental management system deployed to control the temperature and other physical conditions of the computer room in FIG. 1 comprises multiple temperature sensors 110. In other examples there may also be sensors to measure humidity or other physical conditions of the computer room.

To remove the heat generated by the servers, the environmental maintenance modules for the computer room comprise multiple CRACs 120. The CRACs can have operational parameters that can be modified by their module controllers. The sensors may be integral to the CRACs or connected to a separate control system, or a combination thereof. The environmental maintenance modules for the computer room may also comprise humidifiers, dehumidifiers, heaters or other devices for modifying the physical conditions of the environmental space.

In the example of a raised floor data center, the CRACs distributed throughout the room receive warm air from the room, cool it and expel it to the plenum under the raised floor. That cool air flows to and through perforated tiles in the raised floor. These perforated tiles are located in the cold aisle. These CRACs may individually measure their air intake and discharge temperatures but not temperatures elsewhere in the data center (which are measured by separate sensors).

Figure 2:
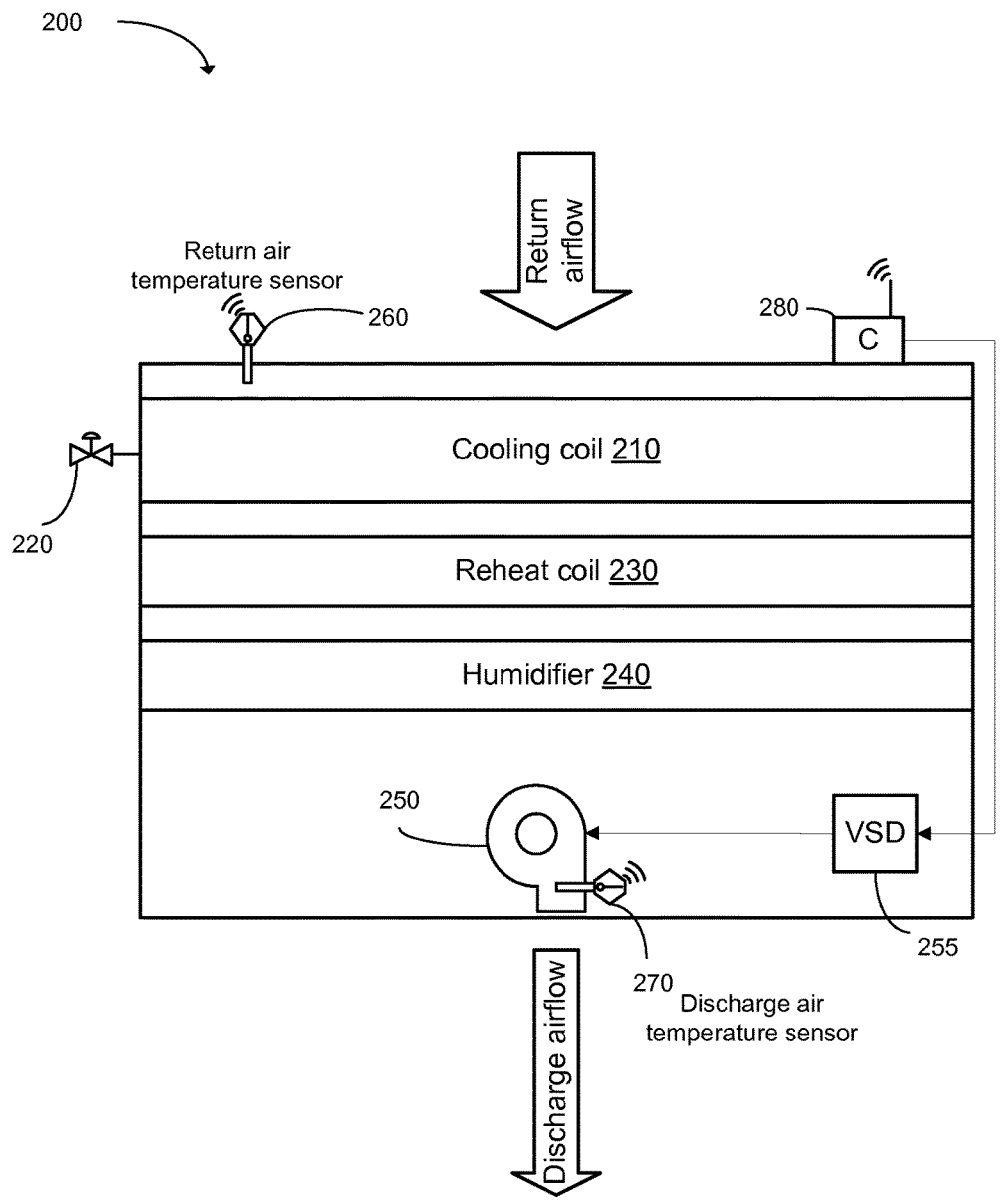
FIG. 2 is a block diagram of a computer room air conditioner, according to an embodiment of the present invention.

FIG. 2 shows an example of a CRAC 200. The CRAC takes in Return airflow from the computer room and expels a Discharge airflow into the computer room. The Return and Discharge airflows may be provided with temperature sensors, which may be distinct from the temperature sensors 110 of the computer room. To control the environmental variables of the computer room, the CRAC may use a cooling coil 210, a reheat coil 230 and a humidifier 240. A chilled water valve 220 may be controlled to adjust the extent of the cooling (or heating). The speed of the Discharge airflow may be controlled by a fan 250 connected to a variable speed drive (VSD) 255. Finally, the various controllable actuators of the CRAC can be modified by signals received from the supervisory controller through a communication link 280, which may be a wired connection, a wireless connection, or simply a connection to an attached memory containing control algorithms or preset values.

C. Initialization

Figure 3:
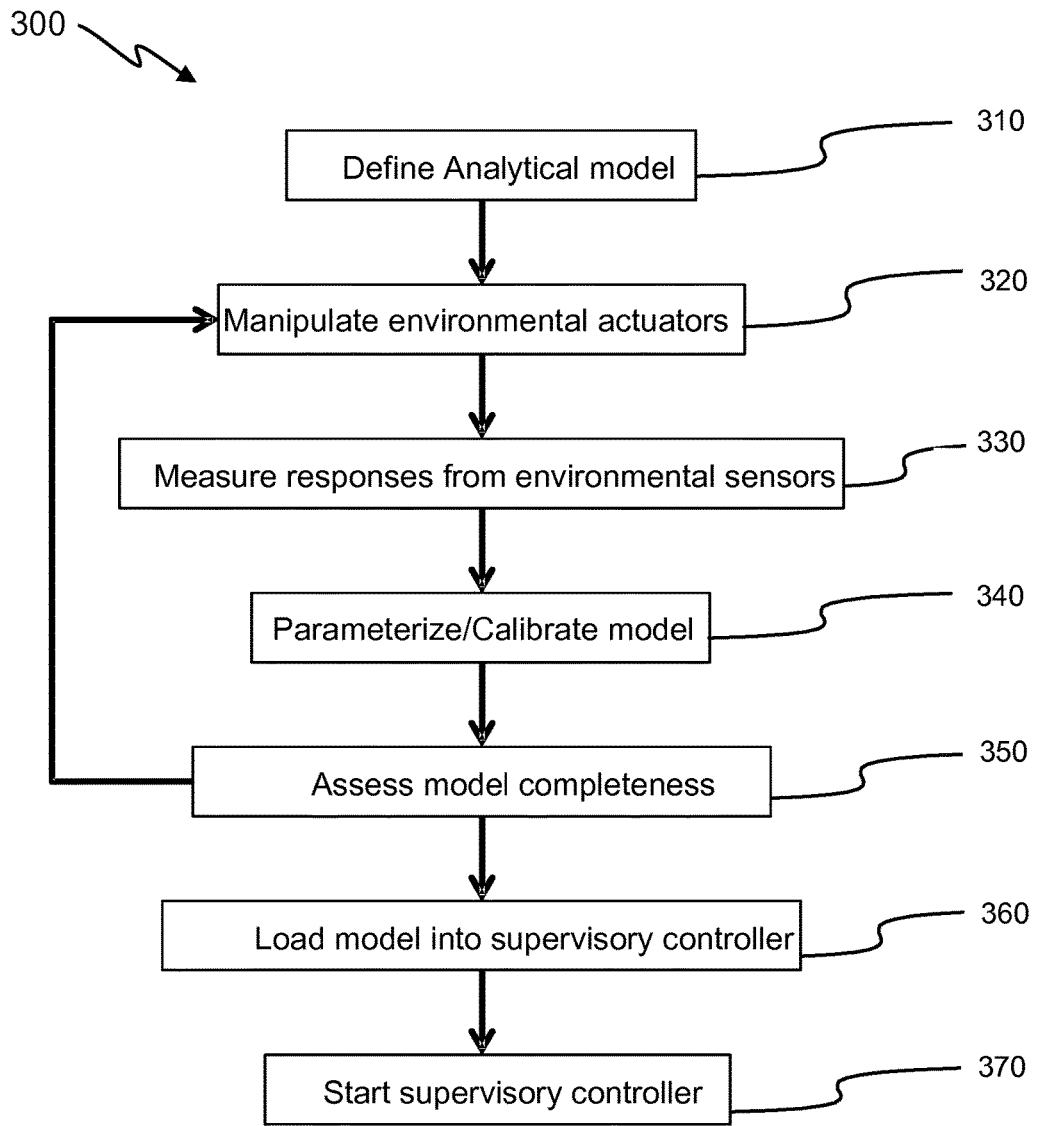
FIG. 3 is a flow chart of an embodiment of a method for initializing a supervisory controller, according to an embodiment of the present invention.

In cases where the system is managed by a supervisory controller using an influence model, the model can be installed at the controller when the system is installed, or the model can be can be initialized during installation using the method shown in FIG. 3. The method of FIG. 3 can also be used to calibrate, i.e. optimally adjust and model parameters. For example, if a supervisory controller is using a linear control transfer matrix G as described above, the method of FIG. 3 can be used to calibrate the entries of G. This method is assumed to be performed before the system is operational. Only then can the supervisory controller start controlling the environmentally managed system.

FIG. 3 shows the general stages involved in a typical initialization process 300.

At stage 310, the process can start with a definition of an analytical model, in the form of a set of parameterized mathematical equations, such as for the linear control case for a transfer function G. Some of the model parameters, e.g. entries of G, can be known from written specifications about the environmentally controlled system, such as CRAC manuals, or from initial numerical simulations, but other parameters typically have to be experimentally determined from the stages that follow.

At stage 320, environmental actuators are manipulated by an administrator or by control software. Manipulations comprise changing set points on the actuators, usually the same set points that the supervisory controller will use to control the actuators later. The set point changes are selected to cause environmental changes of sufficient size and quality from which model parameters can be inferred. Then at stage 330, the physical conditions of the space are measured and recorded using the same environmental sensors that the supervisory controller will use during operation.

At stage 340, the model parameters are computed and/or calibrated from the set point changes and the measured data. In the case of linear control, an individual change in a value of a control variable can be used to infer a row of entries in the transfer matrix G.

At stage 350, the model is assessed. If the model is deemed unsatisfactory, stages 320-350 may have to be repeated as often as necessary. Assessment may involve adjusting the locations and numbers of sensors and modules, if required. Various criteria of assessment may be used, such as energy efficiency, or numerical stability.

At stage 360, the finished model is loaded into the supervisory controller. Once loaded, at stage 370 the supervisory controller is started. The controller then starts making control decisions based on the model to maintain the desired settings of the physical conditions of the space.

The utility of this type of method of initialization and/or calibration of an influence model for a supervisory controller has been demonstrated in data center applications. However, there can be problems. For example, weaknesses can relate to initializing a model for an environmental maintenance system that is already operation. Second, there are weaknesses related to updating an existing model during operation of a system to account for changes in the space. Third, even when a model is capable of being updated during operation of a system, there are weaknesses related to finding an optimal updated model. Fourth, there are weaknesses related to determining model quality. Many of the weaknesses arise, at least in part, from the need to apply the method of FIG. 3 initially and separate from, and not integral to, the supervisory controller procedure. The following five cases illustrate these weaknesses.

D. Problems with Initialization

1. Introduction of Supervisory Controller to a System in Operation

While satisfactory in some cases, the model initialization method of FIG. 3 can be unsatisfactory for deployment to an environmental management system that is already installed and operational. At the beginning of this case, a data center is already fully operational with individual, manufacturer supplied CRAC controllers but no supervisory controller installed. The computing equipment performs mission critical operations and produces heat that unpredictably varies with time. Server air intake temperatures should be kept at user-defined safe levels at all times. The administrator has configured the CRAC set points to provide acceptable levels of cooling. Without supervisory controller with access to rack level temperature sensors, an administrator may overcool the control room in order to maintain a safe temperature at the racks.

An administrator then decides to install rack-level environmental sensors and to deploy a supervisory controller for the CRACs to monitor rack temperatures and to maintain safe temperature levels at those locations. The administrator deploys the supervisory controller with the promise of overall energy savings due to reduced cooling power.

Supervisory controller deployment and any installation procedures should occur in this live operational environment in order to minimize down time. Monitored rack temperatures therefore may at no point exceed preset thresholds once CRAC set points are being changed as part of the supervisory controller deployment (e.g., for the purpose of model initialization) even before the actual supervisory controller is started.

The inherent danger of executing stages 320 and 330 in an environmentally managed space that is already operational is that these stages risk exceeding the very thresholds that the supervisory environmental control system is designed to avoid. A typical partial solution is often to vary one actuator in stages 320 and 330 while other actuators are set to ensure overly safe physical conditions of the space. However, these settings may not accurately reflect the operational levels that will exist after the supervisory controller has been started. Further, the resulting influence model parameters may not be completely accurate for operational levels that will exist.

2. Recalibration of an Initialized Model after System Changes

An influence model may have been successfully initialized by the process of FIG. 3 and the supervisory controller may have been operating satisfactorily for an extended period of time. However, an administrator may then decide to make structural changes to the data center control room floor plan, such as one of moving substantial portions of the computing equipment, replacing some solid floor tiles with perforated floor tiles and vice versa, or modifying air flow by the deployment of baffles, air flow curtains, air ducts, etc. The administrator may also decide that the changes are so substantial that the existing model representation in the supervisory controller has become irrelevant and that even the supervisory controller's regular model update mechanisms are not quick enough to bring the model up to date so that the supervisory controller can continue to make 'good' model-based decisions. The influence model thus needs to be quickly re-initialized. To use the method of FIG. 3 safely, it would require reducing or stopping the current operations of the data center.

3. Model Initialization in a Reset Control System

Consider case 1 above with the following additional features. Each CRAC is configured in return air temperature control mode. This means that a CRAC communicates a set point for the return air temperature to the supervisory controller. The CRAC then adjusts its compressor and fan speeds to control the discharge air temperature and flow rate in a manner that attempts to keep the return air temperature close to the selected set point.

The return air temperature control mode is known to be unsatisfactory from an energy point of view and often unstable in practice. One reason for the unsatisfactory behavior is that actual airflow patterns in a data center may transport cool discharge air from a first CRAC more or less directly to the return air temperature sensor of a second CRAC without passing through the computing equipment where it would have been heated. As a result, the second CRAC is prompted to reduce its cooling output although this may lead to overheating somewhere else in the controlled environment. A supervisory controller addresses this problem by individually and continuously resetting the return air temperature set points of the CRACS to appropriate levels. This reset control is described in general terms with respect to FIG. 4, as now described.

Figure 4:
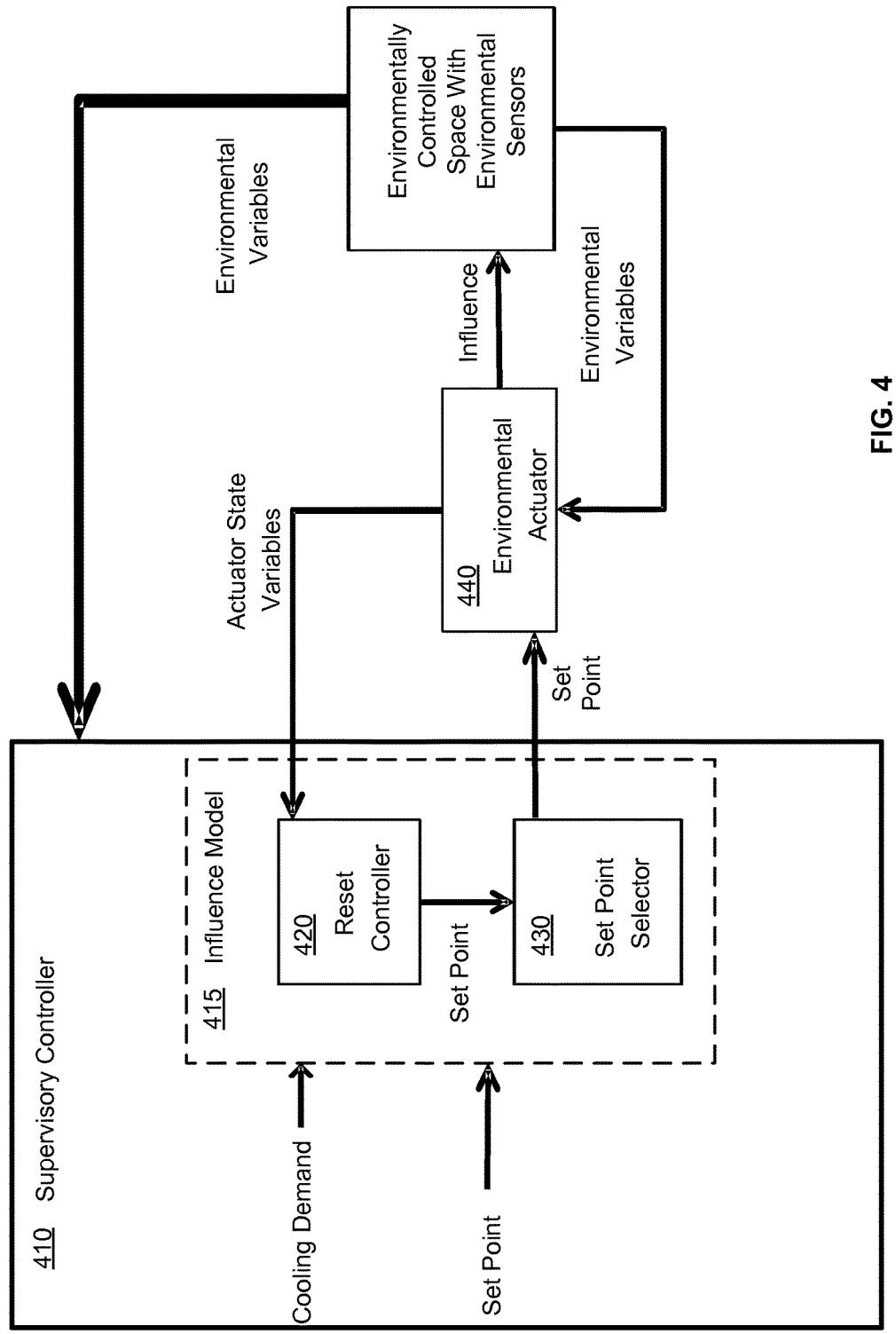
FIG. 4 is a block diagram of a method of control for an environmentally controlled space, according to an embodiment of the present invention.

For simplicity, the diagram in FIG. 4 includes only one environmental actuator 440 influencing the environmentally controlled space, under the control of the supervisory controller 410. The actuator is configured to influence the space in such a way that a physical condition of the space tracks an externally accessible set point. The supervisory controller can directly set this set point or indirectly by way of a subsystem called a 'reset controller' 420. A set point selector 430 chooses between the direct or the indirect option, for example based on some priority rule. The reset controller receives a cooling demand variable from the supervisory controller and continuously adjusts the set point of the environmental actuator in such a way that actuator state variables track the cooling demand variable. The actuator communicates these actuator state variables to the supervisory controller. Examples of actuator state variables are fan speed, compressor speed, fan position, rate of heat removal, power, etc. and mathematical combinations thereof. Their availability depends largely on how the actuator's manufacturer has instrumented and configured the actuator.

The properly tuned reset controller is known to stabilize a system of CRACs that are configured in return air temperature control mode and is otherwise useful in many control systems. As a result, while in an unstable system it may be impossible to define an influence model between an actuator set point and an environmental sensor (because of uncontrolled oscillations), in a supervised system with reset controllers an influence model may be defined between a cooling demand variable and an environmental sensor.

Thus, initializing an influence model for a supervisory controller that has a reset controller subsystem is problematic since the reset controller subsystem should already be operational in order to convert a cooling demand into supervisory-controlled actuator set points.

4. Model Optimization and Recalibration

Consider the data center from case 1 above. An influence model has been created and has been loaded into the supervisory controller. The supervisory controller is made operational. Consider a situation where the model predicts that a CRAC can be set to minimum cooling or even be turned off to save energy without causing any of the environmental sensors to exceed thresholds. The supervisory controller subsequently turns off that CRAC. Further assume that the model prediction was correct so that the controller keeps the CRAC off for an extended period of time (e.g., for weeks).

Next, assume that the administrator reconfigures the data center without re-initializing the model with the expectation that the supervisory controller can and will update the model over time to better reflect these floor plan changes. The model quality can quickly degrade in this situation because predictions will fail to materialize due to the floor plan changes. For example, assume that the changes were such that the turned-off CRAC would now be the most efficient unit to keep critical environmental sensors from exceeding thresholds. Based on the old model, the supervisory controller keeps the CRAC off so that no new information about either the model or the model quality can be drawn from it. This is clearly an undesirable situation.

5. User Perception Prevents Model Updating

A user, such as an human operator or other administrator, may have the perception that the need for improving the model may appear to be in direct conflict with energy optimization unless the user receives visual aids to reconcile the apparent conflict. This user perception is explained in more detail below in relation to Opportunity Costs Consider a data center comprising CRACs with an active supervisory controller. Assume that the user is provided with a visual representation of (aspects of) the influence model. Using this representation, the user will, for example, identify subsets of CRACs that positively, negatively, or not at all influence a particular rack in the data center and form a mental understanding of controller operations. A human operator will view actual controller decisions through this mental viewing lens. It is not important that mental picture accurately reflects actual controller decisions.

Next, consider a situation where as a result of energy-optimal control decisions a non-influential CRAC has shown little activity over a long period of time. With little variation of the CRAC's cooling output, the influence model of that CRAC will have aged and may no longer accurately reflect that CRAC's true influence. Only a CRAC calibration control step that contradicts the optimization based on the current model can recalibrate the model (for example increase the CRAC's cooling output to 100% to see its effect).

To the user, that calibration control step may appear energy-inefficient or even wrong in view of the current model if the influence model does not change after that step. On the other hand, if the influence model does change after the calibration step in a way that makes the CRAC appear to be more influential, the user will think the calibration control step was a worthwhile endeavor that leads to better energy optimization. Of course there is no way of knowing the result and the true cost (in terms of actuator energy usage or savings) ahead of time. This situation reflects therefore the opportunity costs associated with obtaining an accurate model vs. optimization with an inaccurate model. These opportunity costs may not be apparent to the user in a visual influence model representation alone unless they are explicitly visualized as well.

E. Ad Hoc Strategies to Achieve Calibration, Update and Optimization

In order to initialize or update an influence model, it is necessary to infer the influence of component environmental actuators on a physical condition of the environmental space. To do so, an actuator can first change its level of actuation relative to that of the other actuators in the system. To illustrate, consider a data center with CRACs that have fans with Variable Speed Drives (VSD). The supervisory controller can set the fan speeds to desired levels. Consider further a control strategy where the supervisory controller at all times changes all fan speeds in unison by the same amounts and then observes the resulting temperatures in the data center. From these observations alone it is not possible to determine what the influence of a single CRAC on any environmental variable is; only the total influence of all CRACs together may be inferred. On the other hand, changing the fan speed on one CRAC at a time relative to all other CRAC fan speeds over time creates enough relative variation to distinguish the influence of one CRAC relative to another. In a reset-controlled system per case 3 and FIG. 4, the aforementioned actuator changes are replaced by changes in cooling demand.

A first strategy to effect relative actuator changes for the purpose of inferring influence model parameters is to change one actuator set point by a first amount and to change all other actuator set points by a second amount. The first or second amounts can be zero. The disadvantage of this method during operation of the system is that prescribing these amounts effectively overrides any other control strategy. As a result, environmental safety thresholds may be violated in the process of determining influence parameters and that process may use more actuator energy than desired in a power conscientious operation.

A second strategy is to effect random relative actuator changes and let the regular supervisory control strategy continue thereafter. The advantage of this method is that the supervisory controller continues to maintain environmental safety thresholds after the random disturbance. The disadvantage is that random changes are rarely energy efficient in terms of actuator power consumption. Also, depending on how the supervisory controller is configured, the random change may quickly be undone before a sufficient influence model could be determined.

A third strategy to effect relative actuator changes is to use every regular control action of the supervisory controller as an opportunity to infer actuator influences. The disadvantage of this strategy is that some actuators may never be actuated by a sufficient amount in order to infer an influence model for them. For example, the supervisory controller may decide to keep an actuator permanently at a fixed minimum (or off) based on an outdated influence model that predicts that using that actuator is not energy efficient. Without at least an occasional actuator change or 'probe', the supervisory controller will never know if the actuator's influence on an environmental may have changed over time.

Next, in regard to model quality, clearly a purpose of having an influence model is to make optimal control decisions that are based on the model. The quality of a model is expressed by how well predictions made using the model reflect actual events. The quality of an existing model can generally be determined more quickly than creating a new model. The model is poor if predictions are poor and control decisions that are made with a poor model are less likely to be optimal.

A problem of existing supervisory controllers is that model quality need not enter model-based decisions. Even if model quality is relatively poor, control decisions made by the supervisory controller are made as if the model was perfect.

Existing environmental management systems with supervisory controllers (as described above) have disadvantages that embodiments of the present invention can address.

II. Combining Model Control and Calibration

The problems with the solutions discussed above result from splitting the tasks of the supervisory controller into distinct phases that could be classified as: (1) Model Initialization and/or Calibration, (2) operational control to achieve primary control goals, i.e., minute to minute control decisions, such as by use of a Proportional-Integral-Differential (PID) controller using an existing model, and (3) optimization, i.e., primarily a recalibration of the relative contributions of all environmental actuators in order to achieve secondary goals, such as minimizing or saving total actuator power. These phases are often executed as sequential tasks. For example, an initial model is first calibrated, thereafter a supervisory controller is started to execute operational control of the system, followed by optimization or recalibration later. This later optimization and recalibration of the influence model can repeat in sequence steps (1), (2) and (3) above.

An advantage of embodiments of the current invention is that these distinct phases can be largely concurrent in the supervisory control method and therefore able to better and more efficiently control an environmental space that is changing over time in the sense that the best model representation needed for various subtasks changes substantially over time. Problems discussed above can arise because control decisions that were made using a current model were not efficient because of the limitations of that current model and/or did not improve the model quality.

A. Methods for Concurrent Control and Calibration

Figure 5:
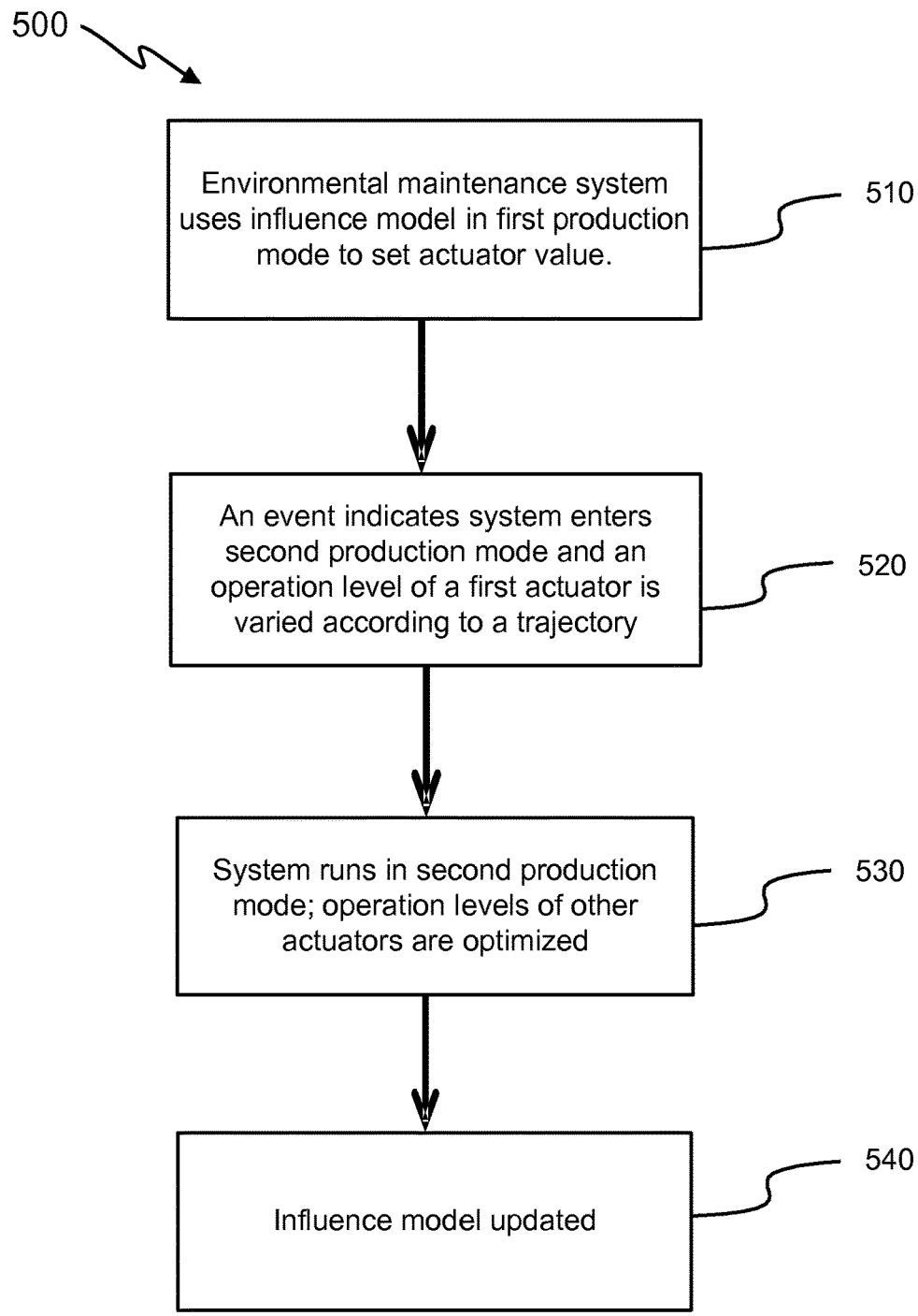
FIG. 5 is a flow chart of a method of updating a model of an environmental management system, according to an embodiment of the present invention.

FIG. 5 is a flow chart of a method for updating an influence model of an environmental maintenance system according to embodiments of the present invention. The system includes a plurality of environmental maintenance modules and a plurality of sensors that measure respective values of physical conditions of an environment. Each module may include one or more actuators.

At stage 510, the environmental maintenance system runs in a first production mode that uses the influence model to determine operation levels of the actuators. This production mode can operate, e.g., as described in U.S. application Ser. Nos. 13/215,189, 12/860,820, and 12/396,944.

For example, sensor values of the sensors can be measured. First operation levels can be determined that optimize a first cost function such that predicted sensor values do not exceed a threshold. The predicted sensor values are determined using the influence model based on input levels of the actuators. That is, the influence model can receive possible operation levels of the actuators and predict what the resulting sensor values would be. In this manner, operation levels can be determined that do not cause the sensor of values to exceed a threshold. The cost function can include the constraint that the sensor values do not exceed a threshold as well as other costs, such as energy and maintenance.

At stage 520, an event indicating a second production mode in which the influence model is updated can be identified. A first operation level of a first actuator is varied as part of an update procedure of the second production mode. The operation level of the first actuator can be varied according to a predetermined trajectory and is not determined by the influence model. A trajectory may be a function of time specifying the operation level of the first actuator. As examples, either a chilled water valve setting or a speed of a return airflow fan of a CRAC can be modified over time according to a chosen trajectory or function. In various embodiments, the event can be a periodic event where the operation levels of the actuators are automatically varied in succession, can be based on criteria specific to an actuator (e.g. the actuator has not changed in operation level for greater than a specified time period), or can be determined by analyzing the influence model to determine that the confidence of the prediction for a given actuator is too low and thus the influence model should be updated. Other actions may also serve as an event indicating the second production mode is entered.

At stage 530, the environmental maintenance system is run in a second production mode. As mentioned above, the operation level of the first actuator is constrained to have a first trajectory. Examples of trajectories are provided in sections below, and may be constant or change over time. At times during the modification of the operation level of the first actuator, operation levels of a subset of the remaining actuators are determined that optimize a second cost function based on measured sensor values. The subset does not include the first actuator.

The second cost function can be different from the first cost function in that the operation level of first actuator is not included in the second cost function, as operation level of first actuator is constrained to the first trajectory as part of a calibration and/or model update process. However, as operation levels of the other actuators are determined by the model, the resulting sensor value should be kept within range. More than one actuator can be constrained to a particular trajectory during such a second production mode, but typically only one or two actuators would be constrained so that the system can still keep the sensor values within range.

At stage 540 the influence model is updated based on the first trajectory, the second operation levels, and measured sensor values. For example, at each time step, the operation level of the first actuator is determined based on the first trajectory and the second operation levels are determined based on optimization of the second cost function. These operation levels can then be transmitted to the actuators to affect their operation, resulting in a change of the sensor values, which can be measured throughout the process. The influence model can be updated since the operation levels in the resulting sensor values are known. In one embodiment, a least squares technique can be used for updating the influence model.

B. Systems

Figure 6:
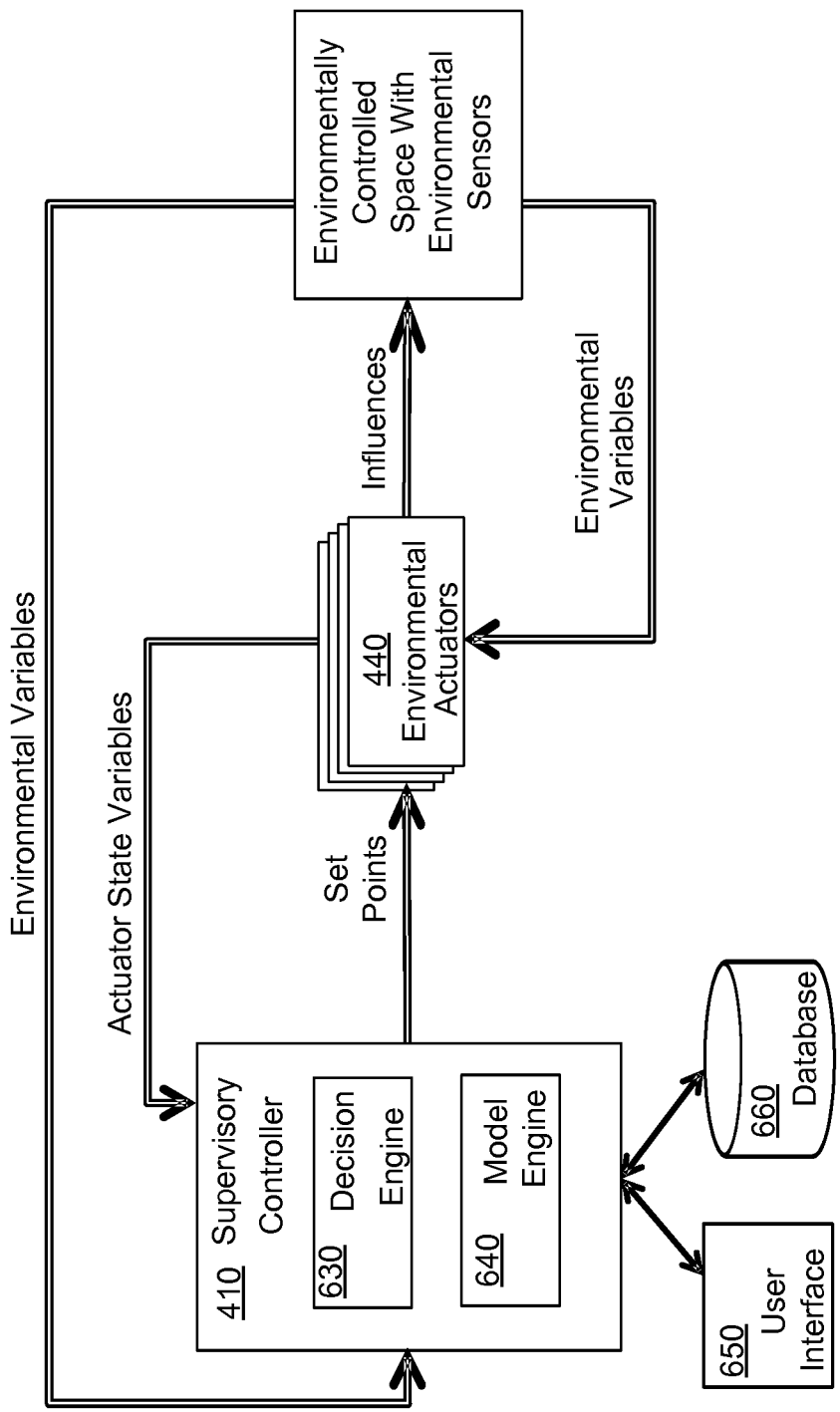
FIG. 6 is a block diagram of a system for controlling an environmentally controlled space using a supervisory controller, according to an embodiment of the present invention.

FIG. 6 is a diagram of an environmental control system that comprises a supervisory controller 610 operating according to one embodiment. In this system, environmental actuators exert environmental influences on the environmentally controlled space. Environmental sensors in that space report environmental variables to the environmental actuators and/or the supervisory controller. The environmental actuators communicate set points to the supervisory controller so that the controller can communicate desired set points to each actuator. The actuators also communicate actuator state variables to the supervisory controller. The system can further configured so that the supervisory controller communicates with a data archival system such as a database (DB) 660 and a user interface (UI) 650 through which a human operator or other agent can interact with the supervisory controller.

The supervisory controller comprises a decision engine 630. The decision engine makes control decisions and computes set points that are communicated to the environmental actuators. The supervisory controller further comprises a model engine 640. The model engine has a mathematical representation (or model) of how control decisions by the decision engine influence environmental physical conditions. The model engine makes qualified predictions about a future state of the environmental physical conditions. The decision engine can use qualified predictions from the model engine in the process of making control decisions.

1. Decision Engine

The decision engine of the supervisory controller can make control decisions based on control algorithms and based on a number of rules or heuristics. Control decisions can be direct actuator set point decisions that are communicated to the environmental actuators, or they can be indirect control decisions in the sense that an indirect control decision is converted into direct control decisions with appropriate algorithms before communicating the associated set points to the environmental actuators. For example, in case 3 an indirect control decision could be to maintain a constant cooling output of a CRAC. That indirect control decision would be converted into a sequence of set points computed using the reset controller that then are communicated to the environmental actuator for execution.

The decision engine can use one or more control strategies to satisfy the following principal goals. First maintain safe environmental levels in the environmentally controlled space. Second, of all possible control decisions that are predicted to address the first goal, select control decisions that are more optimal than others with respect to minimizing some optimization metric. For example, this metric could be the total predicted electric power used to operate the environmental actuators. Third, satisfy external overrides to control decisions while pursuing the first and second goals.

There are legitimate reasons that the decision engine would yield to external overrides. For example, the administrator may want to manually enforce a certain control level or set point. This can be considered a known external override. Alternatively, an environmental actuator may temporarily not be following commands as expected, which can be considered an unknown external override. Some reasons for unknown external overrides are (a) a broken actuator, (b) communication loss between the decision and an environmental actuator, (c) an actuator's internal logic that ignores set point commands under certain operational conditions that are not known and/or not used by the decision engine in the decision process (e.g., CRAC-internal safety precautions against excess compressor head pressure), (d) overrides by a user or other agent at the environmental actuator itself, and (e) an actuator that is being controlled by a user or other agent outside of the decision engine's control. While priorities among the three principle goals depend on the application, a typical decision engine can honor external overrides first (some by necessity such as in the case of a broken actuator), then will maintain safe environmental conditions, and, lastly, do so in an optimal fashion.

For model-based control decisions, the decision engine queries the model, information about the model, and predictions (qualified or unqualified) from the model engine. Embodiments can incorporate qualified predictions into the decision making process.

The decision engine's principal goals can sometimes conflict with the need for improving an inaccurate model. For example, there may be a situation where the decision engine keeps a first environmental actuator running at maximum actuator output because a model predicts a high influence on an environmental sensor that is at risk of exceeding a threshold. Over time the actual influence may change and diminish. Without occasionally lowering the first actuator's output, it is impossible to learn this change. If a second environmental actuator has become more influential than the first actuator, it may be more efficient to lower the first actuator's output and increase the second actuator's output. There is thus a conflict between model-based decisions and control actions needed to update the model and improve its quality. Embodiments can address the conflict between model-based decisions and control actions needed to update the model and improve its quality.

2. Model Engine

The model engine can receive some or all of the current and/or archived data about the environmentally controlled space, which include some or all of the monitored environmental variables and actuator state variables, set points, system configuration parameters, and other recorded quantities that help identify the influence of control decisions on environmental sensor data. The received data is (implicitly or explicitly) time stamped and spans a time period that does not have to be a continuous time interval.

It may be useful to limit the time span of the retrieved data. For example, data collected a year ago may not be relevant anymore for modeling the current behavior of the environmental space. Actuator characteristics may have changed over time or the environmental space may have been deliberately reconfigured at some point in the past. Consuming data with older time stamps would result in a model parameterization that makes poor predictions in the current state of the environmental space. Also, one could exclude intermediate time intervals where the environmental system was in another than operational state for which a model is being generated, for example when the system was in a maintenance or emergency situation. Time span limitations can be user configured or algorithms that detect significant changes in the state of the environmental space can determine them.

The model engine calibrates the model using this retrieved data. One method to calibrate the model is to select model parameters in such a manner that the model is optimal with respect to the predictions it makes, wherein each prediction is made from an earlier time in the retrieved time period to a later time in that same period so that predicted values can be compared to actual, historical values. The least squares method can be used to gauge the comparisons and model parameter optimizations.

To give a formal example, assume there are N environmental sensors and K environmental actuators in the environmentally controlled space. For a sequence of sampling times $t_1, \ldots, t_i, t_{i+1}, \ldots$, each sensor n (n=1, N) provides observed environmental sensor values $T_n(t_i)$, and each actuator k (k=1, \ldots, K) has actuator values $u_k(t_i)$. Assume that an explicit predictive mathematical model, comprising N many functions $f_1, \ldots, f_N$ giving predicted values of the respective sensor values in the environmental space, has been defined with model parameters $p_1, \ldots, p_R$, and that the model has the form:

$$T'_n(t_{i+1}; u'_1(t_{i+1}), \ldots, u'_K(t_{i+1})) = f_n(p_1, \ldots, p_R; T_1(t_i), \ldots, T_n(t_i); T_1(t_{i-1}), \ldots, T_n(t_{i-1}); \ldots; u'_1(t_{i+1}), \ldots, u'_K(t_{i+1}); u_1(t_i), \ldots, u_K(t_i); u_1(t_{i-1}), \ldots, u_K(t_{i-1}); \ldots).$$

Here, the $T'_n$ are predicted sensor values and $u'_k(t_{i+1})$ are planned actuator values, at a time step $t_{i+1}$; and the $u_k(t_i)$ denote the actual actuator values used at a previous time step.

In words, given a set of parameters $p_r$ (r=1, \ldots, R) this function computes a predicted sensor value $T'_n$ at a time step $t_{i+1}$ for planned control actions that would use actuator values $u'_k(t_{i+1})$ if we provide a recent history of sensor and actuator values at time steps $t_i, t_{i-1}, t_{i-2}, \ldots$. Using historic data we can make predictions into historic times and compare them to values that actually occurred. Specifically, a prediction $T'_n(t_{i+1})$ for a historic point in time $t_{i+1}$ is made using the actual actuator values $u_1(t_{i+1}), \ldots, u_K(t_{i+1})$ that existed at that time and all relevant prior sensor and actuator history. The error between the actual sensor value and the (historic) prediction is given by $e_n(t_{i+1}) = T_n(t_{i+1}) - T'_n(t_i; u_1(t_{i+1}), \ldots, u_K(t_{i+1}))$. The total error $$e(p_1, \ldots, p_R) = \sum_n \sum_i e_n^2(t_i)$$

is the sum of all individual squared errors of all sensors at all time steps in the retrieved data range. The total error is thus a function of the model parameters $p_r$ and, implicitly, a function of the retrieved historic data.

The method of least squares attempts to determine a set of model parameters $p_r$, such that the total error e is minimized for the retrieved data. The difficulty of the task, and the existence and uniqueness of a solution, depend on the mathematical form and complexity of the model functions $f_n$.

The model engine may further calibrate the model using one or more previous model parameterizations in addition to the retrieved data. This may have procedural benefits since the data that was used to create the older model parameterizations may not have to be kept in storage. Bayesian inference and other methods can be used to determine new model parameters from retrieved data and from older model parameterizations. Just as it may be useful to limit the time span of the retrieved data it may be useful to limit the age of the older model parameterizations, e.g., by limiting the time spans of the data that the previous parameterizations depend on, or by fading out the influence of older model parameterizations on newer model parameterizations, e.g., by way of forgetting factor techniques.

Some guesswork may be necessary to parameterize a model when it is impossible to uniquely determine a parameter from the retrieved data alone. The situations and conditions where this happens depend on the mathematical structure of the model and on the parameter optimization process. Some situations are generic if one considers that the influence model reflects the fact that a change in an actuator state variable may cause a change in an environmental variable.

A first situation in which guesswork is necessary is when the retrieved data set is empty, e.g., in the case when the supervisory controller is turned on but no data has ever been collected before. All model parameters can only be guessed in this case. A second situation is if an actuator state variable does not change value within the retrieved data set, no change in an environmental variable can be attributed to it. For example, if an environmental actuator was off for the entire retrieved time period, and if there is no other prior model information about that actuator, one cannot determine from the retrieved data in what ways turning the actuator on would affect any environmental variables. The influence parameters of this actuator would have to be guessed. A third situation is if two actuator state variables are strictly correlated within the retrieved data set; their respective influences on an environmental variable cannot be uniquely distinguished from each other. For example, half the influence could be attributed to each actuator but that is not a unique choice and is tantamount to a guess.

Methods for guessing model parameters include user configurable default parameters. For example, a user could configure default parameters based on the knowledge gathered from other, similar environmentally controlled spaces. Methods for guessing model parameters further include analytical parameter guessing models that do not rely on data from environmental sensors. For example, an idealized computational airflow simulation of a data center could be used to determine a guess for the influence of increasing the airflow from one CRAC on the temperature of a rack. A simpler parameter-guessing model could guess an influence parameter based on the assumption that a larger physical distance between an actuator and a sensor implies less influence. Other empirical formulations could be used for guessing parameters.

A calibrated model is one that is fully parameterized with model parameters derived from guessing and/or retrieved data. A high quality model makes predictions that nearly come almost exactly true almost all the time. Conversely, a poor quality model makes predictions that nearly never come true or even close. A model can be high quality in some respects and poor quality in others and everything in between. For example, a model may be able to exactly predict the effect that switching off an actuator has on the environmentally controlled space, but completely fail to make an accurate prediction when switching off another actuator.

There are well-known methods to express the quality of a calibrated model. For example, if the model parameters have been obtained by a least squares method, each parameter has an associated uncertainty that is measured in terms of the covariance in the retrieved data. Another example of a quality metric is a confidence interval (or other type of confidence score) for a predicted value. The interval expresses the probability that the actual value for which the prediction is made will lie in that interval. For example, when using 95% confidence intervals, an actual value is expected to lie outside of a predicted interval for an average of five out of a hundred predictions made.

Predictions that are made with a quality metric attached to them are called qualified predictions in this document. Without a metric they are called unqualified.

Qualified predictions that depend on guessed model parameters have inherently high uncertainties or very large confidence intervals. Similar to the model parameters, these uncertainties can be guessed based on other knowledge that the retrieved data provides, for example based on prior user-experience with similar systems.

A confidence score can be based on a length of time that a variation in the operation level of the first actuator is less than a threshold. For example, if an actuator stays at 100% or near 100%, then this can be an indication that the model needs to be updated with respect to the first actuator. The variation could be a range or a statistical variance.

Figure 7:
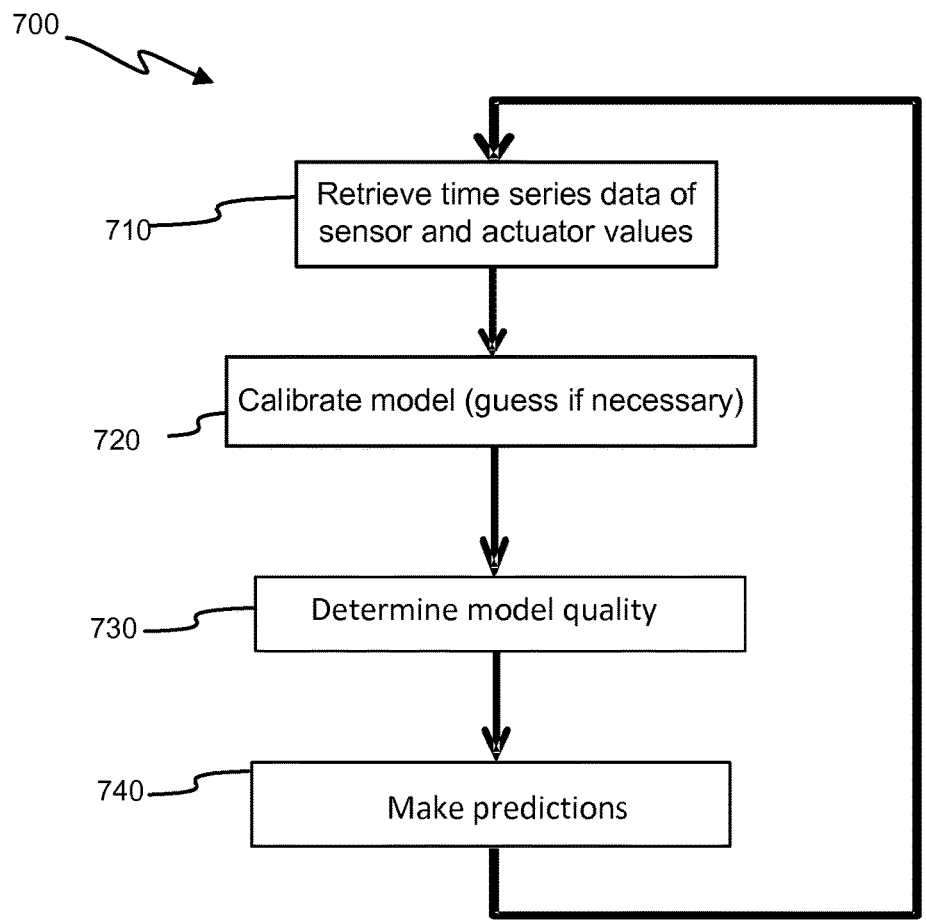
FIG. 7 is a flow chart of a method of updating an influence model, according to an embodiment of the present invention.

FIG. 7 shows the stages of method 700 that a model engine performs in one embodiment to determine or update model parameters. At stage 710, the model engine retrieves a time series of recorded data, typically from a database, comprising at least data about sensor values and actuator values. At stage 720, the model engine calibrates the model with that data, possibly updating a prior model. At stage 730, the model engine determines model quality based on retrieved data. Then, at stage 740, the model engine makes qualified and/or unqualified predictions based on retrieved data.

This process is repeated but not all stages need to be executed in each repetition. For example, stage 720 could be executed rarely (e.g., daily) on a large amount of retrieved historic data (e.g., a week's worth) while stage 730 could be executed more often (e.g., hourly) using only very recent data (e.g. an hour's worth) to validate that the rarely updated model is still relevant. Stage 740 may occur only per request from another part of the system for example per request from the decision engine. Alternatively, the process may be continuously repeated and any new retrieved data may immediately be applied to updating the model, any model quality metric, and possibly any pending predictions.

C. Determining when to Calibrate Particular Actuators

The decision to use a predetermined trajectory as part of calibration can be based on qualified predictions. The qualified predictions can serve to identify an event at which the environmental maintenance system enters the second production mode. Qualified predictions are used to augment existing heuristics that are based on unqualified predictions. Qualified predictions can also be used to create new heuristics.

1. Selections Based on Qualified Predictions

Qualified predictions can be used to select a control decision from a set of possible control decisions. Specifically, if predictions are accurate (have high quality or small confidence intervals) a first control decision may be selected. If predictions are inaccurate (have low quality or large confidence intervals) a second control decision may be selected. Finer gradations are also possible.

To give an example of this selection method, consider a data center as in FIG. 1 with CRACs as shown FIG. 2 as environmental maintenance modules and at least rack-level temperature sensors as environmental sensors. The administrator has defined a critical rack temperature sensor threshold that warrants control actions, and possibly urgent control actions, by the decision engine in order to preserve the integrity of computing equipment. Assume one temperature sensor has exceeded the critical threshold so that additional cooling is needed in the space near the sensor.

First, there are model-free control strategies. A first example of such is to pick one or several CRACs at random or based on some heuristics (such as distance to the critical sensor or highest return air temperature) and increase their cooling output, possibly as quickly as possible, and pick more CRACs in this manner later if the desired effect on the environmental sensor has been insufficient. This model-free approach is not efficient and may cause long response delays until CRACs are selected that are actually influential enough to address the threshold violation.

A second example of a model-free control strategy is to increase the cooling output of all CRACs simultaneously. Increasing the total cooling output risks overcooling the data center in other places than the critical sensor location. Increasing cooling too fast could lead to instabilities. Finally, airflow distributions may be such that some areas in the data center may actually get hotter rather than colder.

Second, there are model-based strategies that use unqualified predictions. Selection methods that are based on unqualified predictions are generally considered more efficient than model free methods. An initial example selects one or more of the CRACs that are predicted to influence the environmental sensor the most and increase their cooling rate, possibly rapidly. More CRACs can be chosen in this manner later if the desired effect on the environmental sensor has been insufficient. Note that in a situation where the model engine resorted to guessing model parameters, this method may actually be equivalent to a model-free selection method, depending on the heuristics used.

Another example of a model-based strategy that uses unqualified predictions is to increase the cooling output of all CRACs simultaneously but with influence-weighed relative offsets or ratios such that a CRAC with high influence increases cooling faster than one with low influence. An advantage of this approach is that even if an influence model is inaccurate, other CRACs that are actually more influential than predicted by the model still contribute to addressing the threshold problem.

Thirdly, there are model-based strategies that make use of qualified predictions. One such strategy is to determine a qualified number of CRACs that are predicted to influence the environmental sensor the most and, possibly rapidly, increase their cooling rate. The number of qualified CRACs can be based on the quality metric of the model; if the model is deemed accurate then fewer CRACs may be needed than if the model is considered inaccurate. More CRACs may be picked in this manner later if the desired effect on the environmental sensor has been insufficient. For example, one could turn up one additional most influential CRAC to its respective maximum every few minutes if the influence model was good, but turn up two instead if the model was bad or even unknown.

Figure 8:
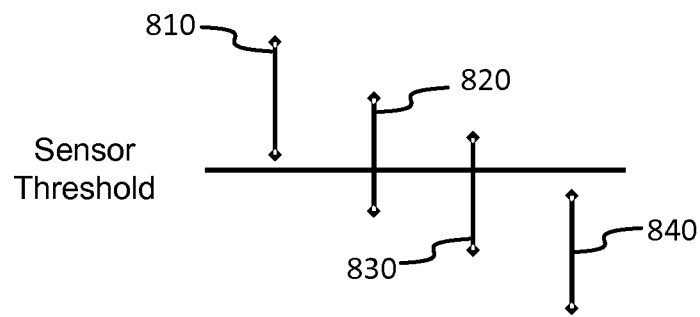
FIG. 8 illustrates confidence intervals of predicted effects in relation to a sensor threshold, according to an embodiment of the present invention.

A second model-based strategy that uses qualified predictions involves qualifying every prediction of a control action's influence by defining a confidence interval on the control action's effect on the critical sensor value. Each resulting confidence interval will be one of the following four types, as illustrated in FIG. 8: (I) the confidence interval is entirely above the threshold (810), (II) the confidence interval is mostly above the threshold (820), (III) the confidence interval is mostly below the threshold (830), or (IV) the confidence interval is entirely below the threshold (840).

This strategy continues by ranking control actions according to its type, and giving preference to those actions with higher numbers. For example, assume that increasing a first CRAC from its current actuation value to its maximum is predicted to result in a likely range of predicted sensor values of type II. Further assume that increasing a second CRAC from its current actuation value to its maximum is predicted to result in a likely range of predicted sensor values of type III. The second CRAC control action is given preference over the first CRAC control action. In addition if increasing both first CRAC and second CRAC from their respective current actuation values to their respective maximum values is predicted to result in a likely range of predicted sensor values of type IV, this combined control action is given preference over the individual control actions. In addition, if increasing a third CRAC from its current actuation value to its maximum is also predicted to result in a likely range of predicted sensor values of type IV, a choice has to be made between the third CRAC control actuation option and the combined first/second CRAC control option. The choice could be made based on which option is likely to use less power, is likely to be effected faster, based on the number of affected actuators, or based on side effects (e.g., how other temperatures in the data center are affected).

Figure 9:
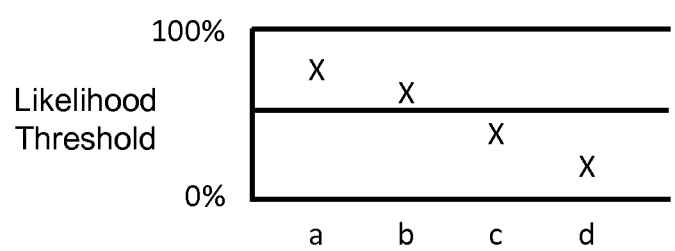
FIG. 9 illustrates model confidence intervals in relation to a physical condition threshold value, according to an embodiment of the present invention.

A third model-based strategy that uses qualified predictions involves qualifying every influence prediction of a control action in terms of how likely it is that that action will solve the threshold problem (or how confident one is in the outcome of that action) and ranking the options by this likelihood. This is illustrated in FIG. 9, in which there are options a, b, c, d. More or fewer rankings may be used as needed. Select the option that is most likely (option a) or select among the options that exceed a certain likelihood threshold T (options a and b). If there is more than one option to choose from, use additional selection criteria such as power, actuation speed, number of affected actuators, or fewer side effects, etc.

There are additional, closely related situations to be considered. First, similar considerations apply when less cooling is needed rather than more. For example, if every temperature sensor is below the threshold it may be useful to lower cooling, e.g., in order to conserve power. Second it is also possible and not unusual to have opposite influences in the sense, for example, that increasing cooling from a CRAC actually increases the temperature at a rack's sensors, and vice versa, because of the way airflow is distributed in a data center. Third, it may be necessary to consider the effects of a control action on not only the critical sensor but also on all other environmental sensors so that no other than the critical sensor become critical as a result of the control action. It is then useful to consider how likely it is that any environmental sensor exceeds a threshold in order to rank control option and not just the one, currently critical sensor.

Selecting control actions along similar model- and model-quality based principles for such situations are within the capabilities of a practitioner in the art.

Figure 10:
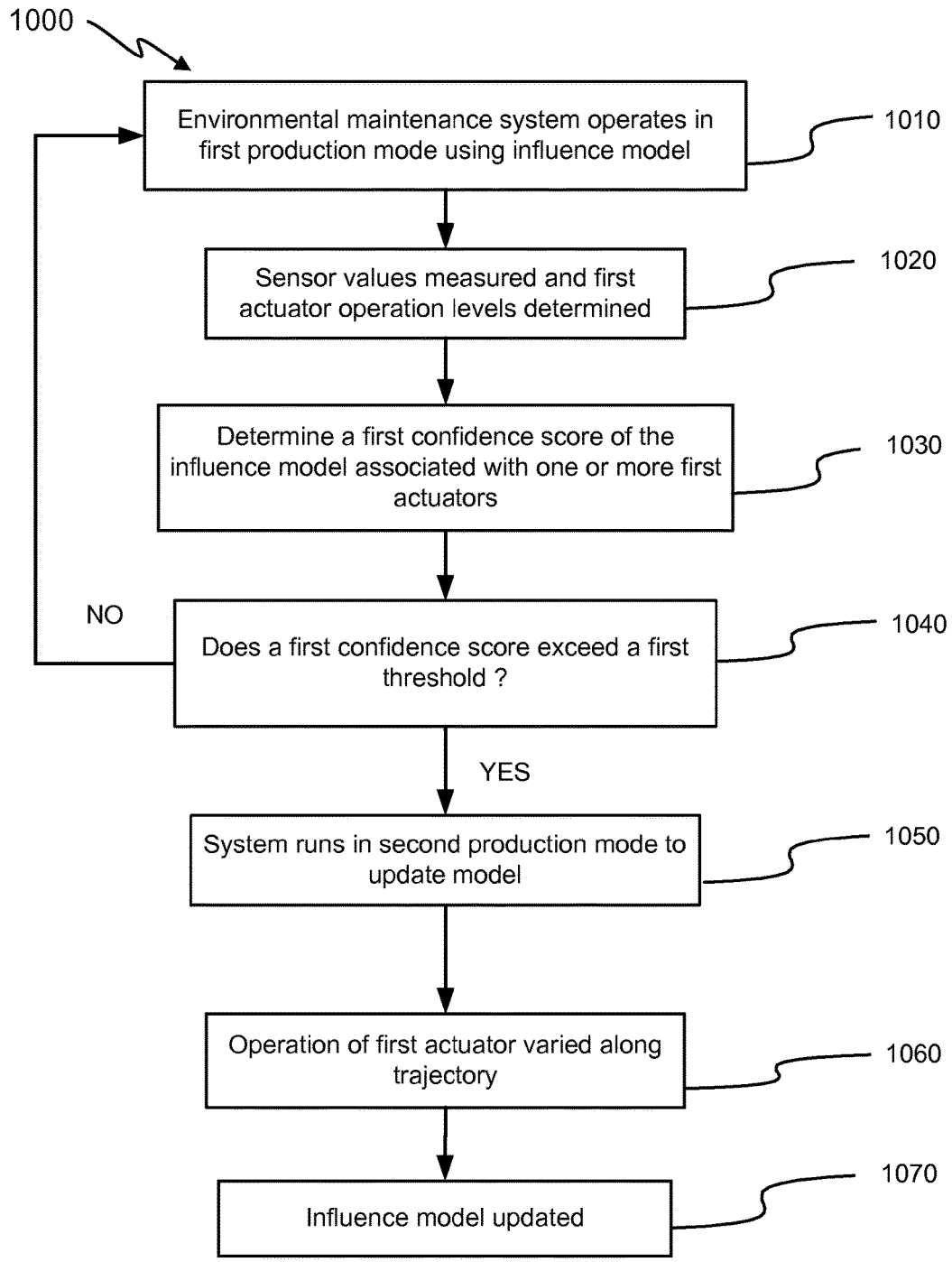
FIG. 10 is a flow chart of a method of updating a model of an environmental management system, according to an embodiment of the present invention.

FIG. 10 is a flow chart of a method 1000 that may be used to implement these embodiments.

At stage 1010 the environmental maintenance system operates in a first production mode using an influence model. The model used may have been determined at installation initialization, or may be a recently updated model. The model quality may be sufficiently high that the system successfully maintains physical conditions by use of the model.

At stage 1020 (e.g., as part of this first production mode) values of sensors and operation levels of actuators can be determined. In some embodiments, the determination is made by the decision engine, using predictions from the model engine, as discussed above.

At stage 1030 (e.g., also during the first production mode), confidence scores are determined for the actuators. The confidence scores may be based on the values of the sensors, the operation levels of the actuators or the time the model has been in use. Other data may also be used to determine the confidence scores.

At stage 1040 a decision is made on the basis of the confidence scores. If all scores of the confidence levels are above a threshold, then the system continues operation in the first production mode. This determination can be based on confidence intervals of predicted actuator values, or by likelihood values, as described above. Other decision criteria may be used.

At stage 1050, however, if a confidence score has exceeded a threshold, the system is switched into a second production mode in order that the influence model may be updated. At stage 1060 the actuator's operation level is varied as described above along a specific trajectory of levels over time. In one embodiment the trajectory is selected to move the operation level beyond how the current state of the model would adjust the first actuator's operation level. While the operation of the first actuator is moved along the trajectory, the other actuators may have their operation levels adjusted, such as by the supervisory controller, to attempt to maintain the physical conditions of the space within desired ranges. These adjustments and the sensor values can then be recorded as the first actuator's operation level is moved along the trajectory.

At stage 1070 the model is updated using at least the first actuator's operation levels along the trajectory and the recorded sensor values and adjustments to the other actuators' operation levels that occurred during the time of the first trajectory.

2. Calibration System

Figure 11:
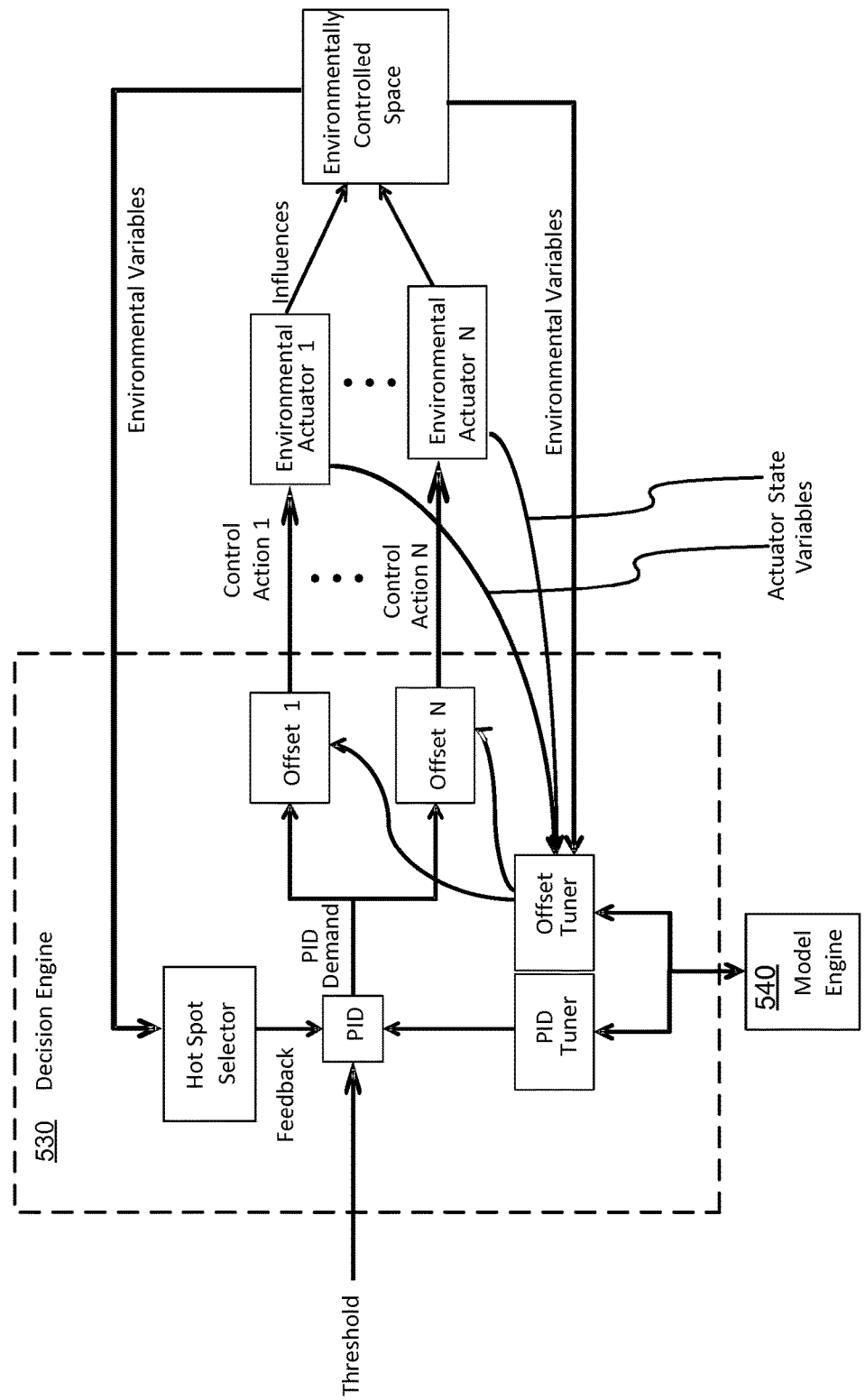
FIG. 11 illustrates a block diagram of a Decision Engine, according to an embodiment of the present invention.

FIG. 11 illustrates an environmental maintenance system that uses a decision engine that traces a path from model-free considerations through model-based improvements to qualified control decisions according to embodiments of the present invention. In this example, a simple single-input, single-output PID (Proportional-Integral-Differential) controller manages the environmental conditions in the environmental space. The PID determines the difference (error) between a feedback signal and a feedback signal threshold. For example, the feedback signal could be the value reported by the hot spot environmental sensor, i.e., the sensor that exceeds its threshold the most, and the feedback signal threshold could be the hot spot environmental sensor threshold. A hot spot selector provides the feedback signal to the PID in this case. From said error, the PID controller computes a PID control output, called 'PID demand' here. This computation is based on well-known PID rules.

The PID demand is modified by individual offsets for each of N environmental actuators (one offset is shown per actuator but there could be more depending on actuator type and number of actuator set points). Offsets could be added or multiplied or comprise other modifiers of the PID demand. The resulting per-actuator demands are communicated to the respective actuators in the form of control actions such as direct actuator set points, by way of reset logic as described earlier with respect to FIG. 3, or in other ways.

First consider a period of time where the offsets are fixed or otherwise independent of a model. The advantage of using the PID controller as a control strategy is foremost that by causing all environmental actuators to act in unison, all environmental sensors may be kept close or well below their respective thresholds under a wide range of operational conditions without model knowledge of the environmental space.

A PID tuner sets PID control parameters. PID tuning often occurs manually using standard tuning rules. With model information from the model engine, PID parameters can be better tuned using known tuning methods to obtain better control performance. With qualified model information from the model engine, PID parameters can be tuned for even better performance.

An offset tuner determines the offsets that modify the PID demand based on environmental and actuator state variables. The offset tuner is in communication with the model engine and can use model-free, model-based and qualified model-based methods to determine these offsets and it can modify none, some, or all offsets continuously, periodically or non-periodically. Offsets can even be selected to completely mask the PID demand signal to mimic a system that has no PID controller. In this sense this example applies to systems without a PID controller as well.

An example of a method for offset selection is to fix the offsets if each environmental variable is within an operating range of values, and to change some (one, more than one, or all) offsets if some environmental variables exceed their respective operating ranges. The operational ranges could be selected so that the system operates under pure PID control most of the time but reflect an emergency situation if a range is exceeded. In the emergency situation, some offsets could be immediately set to large values, or be ramped up quickly to such values, in order to react to the emergency situation more quickly than the PID controller could by itself with a given set of PID tuning parameters. As previously explained, some offsets could be modified to this purpose using a model-free heuristics (e.g., randomly), model-based rules (e.g., modify the offsets of the environmental actuators that have the highest influence on the critical environmental sensor), and/or qualified model-based methods (e.g., modify the offsets of the environmental actuators that most likely fix the critical situation).

In another model-based heuristics, the offset tuner could select offsets that are predicted to address predicted range violations or the possibility of range violations before these violations happen.

The offset tuner could select offsets that optimize one or more cost, or objective, functions. For example, consider the data center of case 1. There are N CRACs in the data center. They are not necessarily equal. From manufacturer's manuals it is known (in this sense this is a model-free method as opposed to one where such characteristics are derived using CRAC operational data) that for current environmental conditions and actuator states, each CRAC can produce $C_n$ (n=1, ..., N) of cooling power at the expense of $P_n(C_n)$ electric power each. It is useful in this case to equate PID demand with total cooling demand $C=C_1+ \ldots +C_N$. A power optimal use of all CRACs could be achieved by selecting offsets $D_n$ so that $G=C/N+D_n$ and $D_1+ \ldots +D_N=0$ and the total power $P=P_1(C_1)+ \ldots +P_N(C_N)$ is minimized.

Figure 12A:
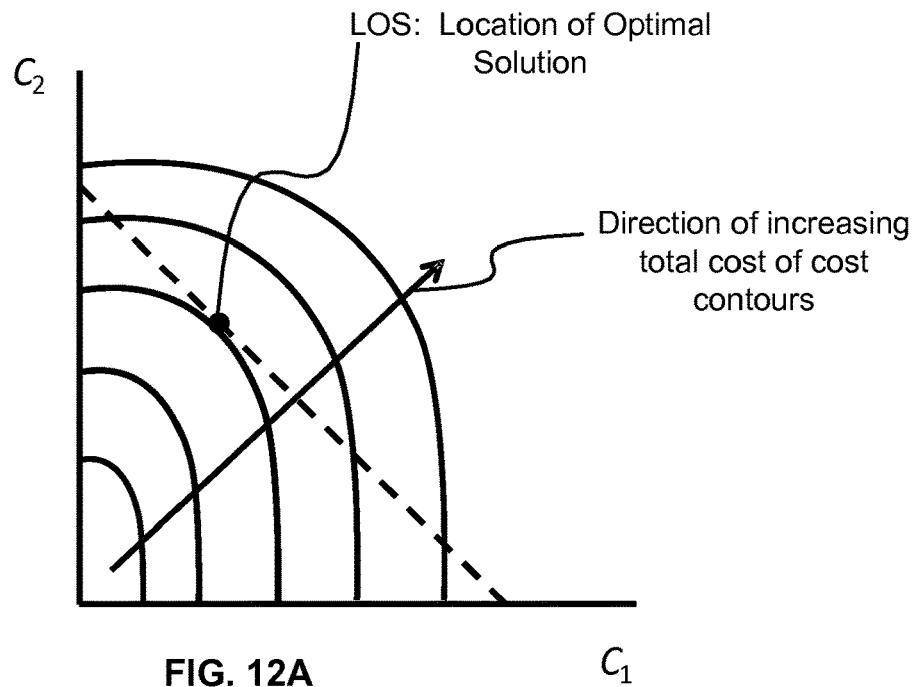
FIG. 12A-12B illustrate contour graphs of total cost due to two control variables, with and without an excluded region, according to an embodiment of the present invention.

FIG. 12A illustrates these formulas for the case N=2. The diagram's axes represent increasing values of per-actuator demands expressed by control variables $C_1$ and $C_2$, which in turn may be input values to respective actuators (e.g. a voltage that adjusts a fan speed or a percent to open a valve). The solid curves represent contours of constant total cost (e.g., electric power) P, wherein P increases from curve to curve in the direction of the arrow. A few such curved lines are shown but one exists implicitly for each value of P. The dashed line represents a line of constant total demand C. The dot on the dashed line indicates the location of optimal cost where the dashed total demand line is tangential to a curve of constant cost. The coordinates ($C_1$, $C_2$) of this dot are the optimal individual per-actuator demands. The associated offsets $D_n$ are then calculated by $D_n=C-C_n$.

Figure 12B:
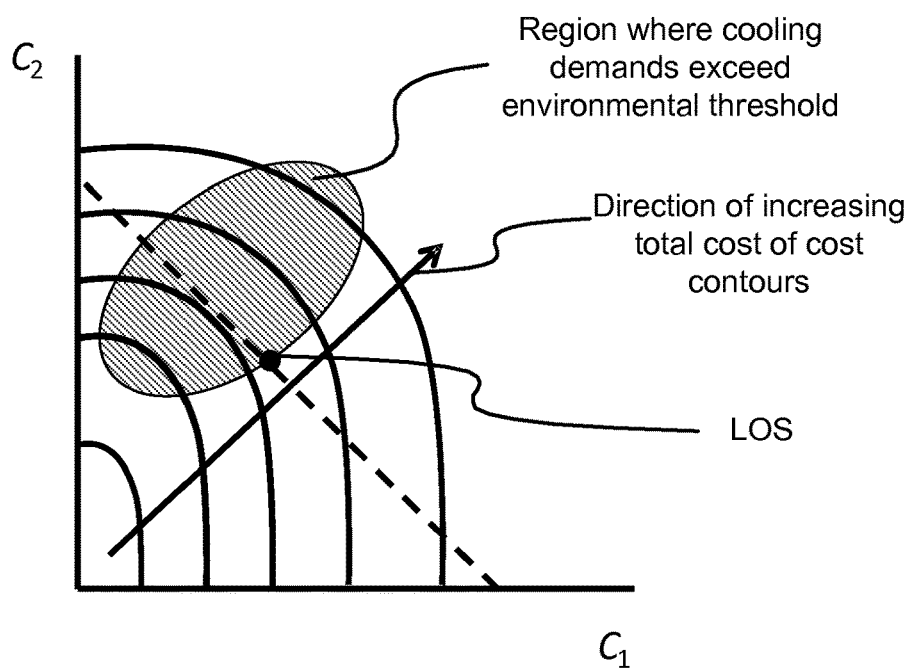

Offset optimization can further include model predictions in order to exclude regions that are predicted to cause environmental threshold violations. For example, FIG. 12B augments FIG. 12A with a crosshatched region where per-AHU cooling demands, as predicted by the model engine, are expected to violate some environmental thresholds. The optimal solution as indicated by the dot can thus lie outside of that region. Optimization methods that can address this type of constrained optimization may use predictive modeling.

Offset optimization can further include qualified model predictions wherein the probability or likelihood of a particular predicted outcome is considered. For example, with reference to FIG. 8 and FIG. 12B, a region of per-AHU $C_n$ (n=1, ..., N) cooling demands could be excluded from the optimization where the qualified model prediction indicates that the probability of an undesired environmental outcome is higher than some threshold.

Alternatively, with reference to FIG. 12A, the total cost function P could be modified to an augmented cost function P' to be used in the optimization by incorporating the probability of a successful outcome into P'. For example, optimization could be based on a formula such as $P'(C_1, \ldots, C_N)=P(C_1, \ldots, C_N)/S(C_1, \ldots, C_N)$, wherein S is a probability of success, i.e., the probability that the combination of per-actuator demands $C_1, \ldots, C_N$ is predicted to not cause undesirable environmental conditions. So, if S is close to zero (little expectation of success), the associated augmented cost P' is very large, and if S is close to 100% the augmented cost P' converges to P. Other augmented cost functions can be defined using qualified model metrics.

A preferred supervisory control system that comprises a decision engine and a model engine therefore combines model-free control strategies with control strategies based on unqualified and qualified model information and predictions such that the environmental system is safely controlled in all states of model accuracy but possibly with varying degrees of safety margins and optimality.

D. Second Production Mode with Calibration Overrides for Control and Influence Model Optimization Several examples have been provided so far where control decisions made using a current model were not efficient because of the limitations of that current model and/or did not improve the model quality. Thus, there can be a tension of model-based control decisions vs. improving the model. Without allowing significant change in at least one control variable, data needed to improve the model may not be able to be obtained.

1. Calibration Overrides

A method to solve this problem is to override some control variables or combinations of control variables with values selected to improve the model while using the remaining control variables or combinations of control variables for regular control to satisfy the stated control goals. By having the supervisory controller explicitly adjust the selected control variables beyond the range the current model predicts, a more advantageous combination of all control variables may be found. The function giving the values for the selected control variable or variables are during the override method is called a trajectory. Examples of trajectories are given below. Methods of selecting which control variable or variables to use are discussed below.

The method is explained with respect to the example in FIG. 13A to FIG. 13D. The example is based on a control system with two environmental actuators that have control variables $C_1$ and $C_2$. An optimization cost function is illustrated by way of contour lines 1310 that connect points of equal cost. An example of an optimization cost function is total energy costs as a function of $C_1$ and $C_2$. Contour line can be open or closed loops depending on the cost function. The example is constructed so that the important concepts of the method can be diagramed in two dimensions but they apply to systems with more (often many more: e.g. more than 20) control variables, where the global geometries of cost functions contours 1310 and especially boundaries 1340 (see below) are practically impossible to map.

Figure 13:
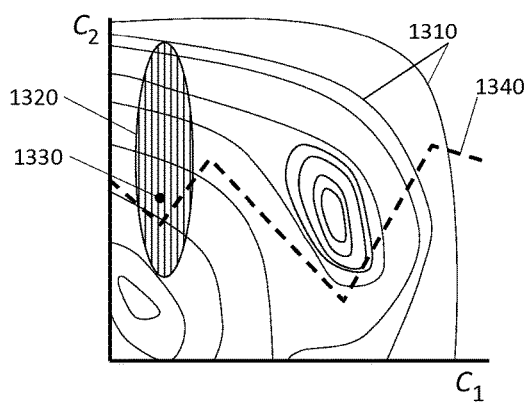
FIG. 13A-13D illustrate trajectories of a control variable being varied along a trajectory, according to an embodiment of the present invention.
Figure 13:
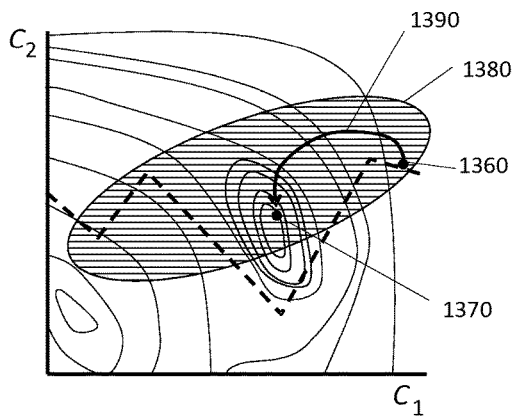
Figure 13:
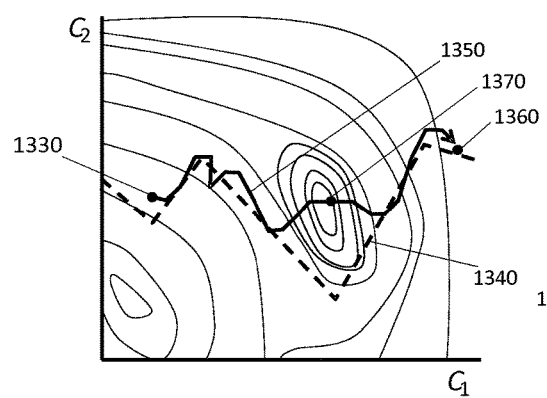
Figure 13:
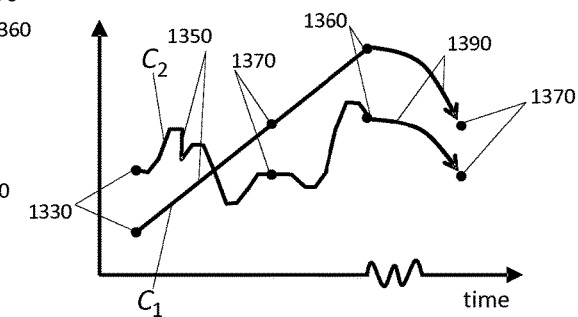

A modeled region 1320 is crosshatched in FIG. 13A and an initial point of operation 1330 of the system is marked therein. The modeled region 1320 is a region for which the influence model has a sufficient quality to make adequate and useful predictions about system behaviors. In general, the initial point of operation 1330 need not lie within the modeled region 1320.

Some combinations of $C_1$ and $C_2$ can lead to environmental conditions that exceed certain thresholds. These conditions create a boundary 1340 that separates the ($C_1$, $C_2$) space into acceptable and undesired points of operation. In FIG. 13A-FIG. 13C, the acceptable points of operation lie above the boundary 1340 and the initial point of operation 1330 therefore is acceptable in this example but need not be in general.

The shape and size of the modeled region 1320 depends on the state of the model. In this example it covers a very narrow range of possible values of $C_1$. An optimizer seeking to find control variables $C_1$ and $C_2$ to minimize the cost function within the modeled region 1320 in view of the boundary 1340 may have resulted in the system being at the initial point of operation 1330 at some point in time. Due to the limited size of the modeled region 1320, the optimizer would not venture sufficiently far to find lower cost solutions in the ($C_1$, $C_2$) space.

To force an improvement of the model, even at the risk of temporarily increasing the cost function, control variable $C_1$ is increased in a predetermined manner (in other words, $C_1$ is forced to follow a trajectory, i.e. a model calibration override), for example at a constant rate, from initial point 1330 to end point 1360. The decision engine loses one degree of control freedom due to this calibration override. During the calibration override, the decision engine uses the remaining degrees of freedom (here $C_2$) to maintain safe and optimal conditions in the environmental space as illustrated by path 1350 (trajectory) in FIG. 13B. The decision engine uses the remaining degrees of freedom for avoiding crossing the boundary 1340 and possibly also for operating at the lowest possible cost given the calibration override situation. For example, intermediate point 1370 is an operational point with lower cost than initial point 1330 that may have been passed along path 1350.

FIG. 13C illustrates that after the calibration override is finished at end point 6, and even during path 1350, the modeled region may be recalculated by incorporating data from the new path 1350. A new modeled region 1380 results within which an optimization may find a better point of operation (shown as intermediate point 1370) than the initial point 1330. After the calibration override has been lifted, the decision engine can take the system from end point 1360 to the optimal intermediate point 1370 in a control step 1390.

FIG. 13D illustrates separate time histories of control variables $C_1$, $C_2$ for the situations described in FIG. 13B and FIG. 13C. A point along the trajectory in the ($C_1$, $C_2$) space in FIG. 13B to FIG. 13C appears as two points in FIG. 13D, one point on curve $C_1$ and one point of curve $C_2$.

2. Example Trajectories

Figure 14:
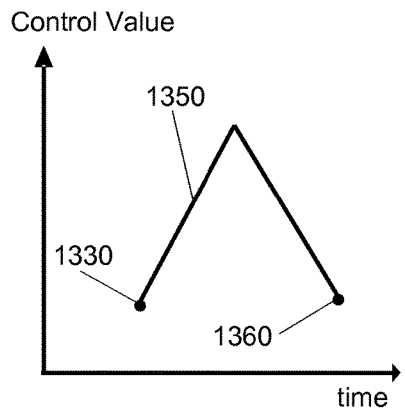
FIG. 14A-14F illustrate possible trajectories for a control variable being changed, according to an embodiment of the present invention.
Figure 14:
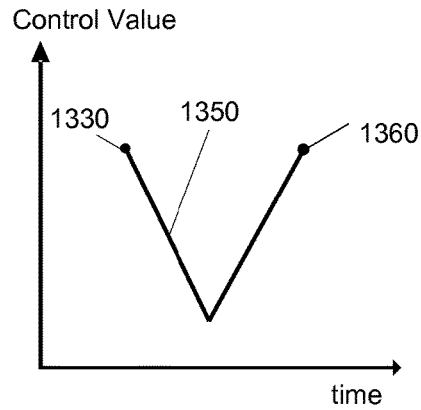
Figure 14:
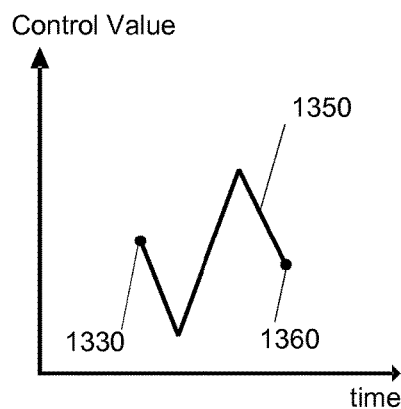
Figure 14:
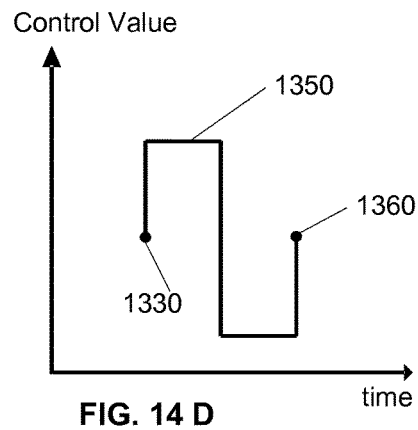
Figure 14:
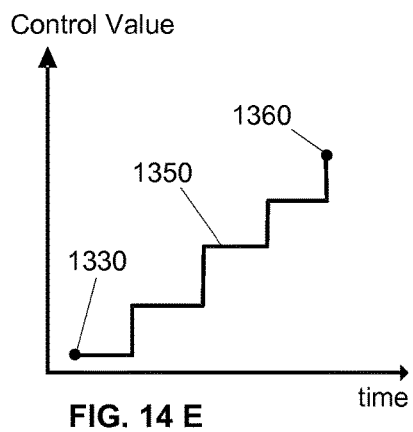
Figure 14:
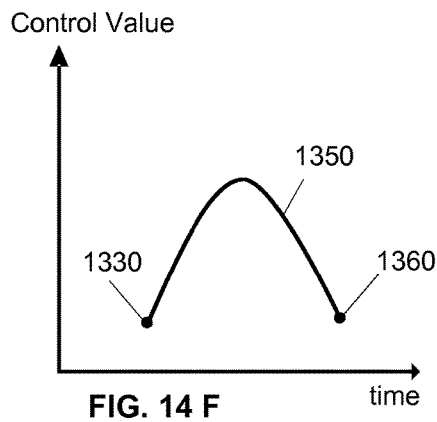

Examples of several trajectories for the first control variable are shown in FIG. 14A to FIG. 14F. Other trajectories that can used will be apparent to one of skill in the art. In none of the trajectories shown is it necessarily the case that the value of the control variable returns to the initial value it had at the beginning of the trajectory. In the trajectory of FIG. 14A the control variable is first increased in value, then decreased, in each stage at a constant rate. In the trajectory of FIG. 14B the value of the control variable first decreases at a constant rate, then increases at a constant rate.

There are various function forms that may serve as useful trajectories. Some are illustrated in FIG. 14A to FIG. 14F. It will be clear to one of skill in the art that other function forms may also be used as trajectories. In FIG. 14A the control variable can be first increased, then decreased, at fixed rates. In FIG. 14B the control variable is first decreased, then increased, at respective fixed rates. In these two cases it need not be the case that the starting values 1330 and the ending values 1360 are equal.

In FIG. 14C the function form consists of multiple constant rate functions that combine intervals of increasing and decreasing control variable values, preferably such that start value 1330 and end value 1360 are the same and also preferably that the path 1350 is symmetric. This may be useful to determine how fast other actuators respond to changes in the first actuator.

In FIG. 14D, the control variable is set sequentially to a maximum value and then to a minimum value for a period of time. The reverse is also possible. Related to this is the function form shown in FIG. 14E in which the values of the control variable are set to a sequence of discrete levels over time, not necessarily a increasing or decreasing sequence.

The function form for a trajectory shown in FIG. 14F shows that the change in the control variable may constantly vary over time at non-constant rates.

3. Exiting Second Production Mode

There are some situations where it is useful to change the predetermined calibration override or even suspend or lift it if the safety of the environmental space is at issue or if predetermined control actions are momentarily not possible. In a first situation the supervisory controller detects an urgent situation in the environmental space. It may be preferable to release the calibration override in order to have all actuators available for protecting the environmental space. This behavior is especially useful in the case where the calibration override is the cause of the urgency. For example, consider an area of a data center where a rack has no cooling redundancy, i.e., a single CRAC provides all relevant cooling for remaining below a threshold. Lowering the cooling output of that CRAC for the purpose of a calibration override may cause overheating and should cause the decision engine to abort the calibration override. Instead, a calibration override that increases cooling output is then the preferred override method in order to provide data for enhancing the influence model.

In a second situation an environmental actuator may momentarily be unable to follow the prescribed control variable in one direction but could follow it in the other direction. This is trivially the case if the actuator is maxed out in some way. For example, an environmental actuator that is off can only turn on, and an actuator that is maxed out can only reduce its output. Some situations are less trivial.

For example, consider a CRAC in return air temperature control mode with an externally accessible return air temperature control set point. Assume that if the return air temperature is higher than that set point, the CRAC responds by increasing its cooling output (e.g., by discharging colder air). A typical CRAC device will have some limits on the values that the return air set point can have. The administrator can impose further limits that the supervisory controller heeds. For example assume that the minimum allowable set point is 70° F. (a similar argument applies to a maximum set point). As long as the return air is hotter than 70° F. the supervisory controller can cause the CRAC to increase its cooling output by communicating a set point to the CRAC that is between 70° F. and that return air temperature (the effective set point range will be smaller in practice due to input side dead bands in the CRAC controller). The closer the return air temperature is to the minimum set point the less control lead is generated (most CRAC controllers react more slowly to smaller return air temperature to set point differences).

As soon as the return air temperature falls below the set point minimum 70° F. (and in practice even before that, a situation that can happen in data centers due to cross flow from other CRACS), the supervisory controller unidirectionally loses control over that CRAC. It cannot further increase the cooling output of that CRAC although it can decrease the cooling output, such as by increasing the return air temperature set point to well above the current return air temperature.

4. Selecting Actuators and Trajectories for a Given Production Mode

An alternative would be to select calibration overrides in consideration of such a unidirectional constraints in order to maximize the resulting control action for the purpose of improving the model quality.

It can be preferable to limit the calibration override to one control variable of an environmental actuator at a time in order to limit any disruption to the remaining environmental control system. If considering more than one calibration override simultaneously, consideration should be given to the redundancies and risks for a given environmental space. The redundancy between environmental actuators and an environmental sensor is the number of environmental actuators that substantially influence that sensor. If that number is high, and/or that sensor is far from exceeding any threshold, a calibration override for one of these actuators can be considered relatively safe. However, since redundancy and influence are often not known until after a series of calibration overrides, the number of simultaneous calibration overrides should be selected conservatively, preferably a low as one.

It can be useful to apply the concept of a calibration override to a control degree of freedom rather than a single control variable. For example, consider a situation where two control variables have changed in unison over time such there is very little variation between the two from which to infer their relative contributions to an influence model. The calibration override could occur such that the decision engine maintains control over the average of the two control variables (a first control degree of freedom) but cedes their difference (a second control degree of freedom) to a calibration override. For example, the difference could deliberately be made to increase over a period of time where it has been near zero before. The term control variable is henceforth meant to include the meaning of a control degree of freedom.

It can be preferable to select which control variable to choose for a calibration override based on a model metric. A simple model metric is the amount of variation of a control variable over time. If that variation is less than a threshold the model engine preferably signals the need for a calibration override for that control variable to the decision engine.

It can be preferable to queue the model engine's requests for specific calibration overrides in a first-in, first out (FIFO) fashion to execute later. A later execution of a calibration override may not be necessary if intermediate calibration overrides or intermediate regular control actions by the decision engine have resulted in improving the metric that caused the calibration override request in the first place.

A FIFO queue of calibration override requests is an advantage if there are stuck control variables that cannot be controlled to improve their influence model metric. Without queuing, the supervisory controller may continuously and to no avail attempt a calibration override on such a stuck control variable while the influence model metrics of other control variables are not improved but could be improved.

5. Opportunity Costs

Examples in previous sections and case 5 alluded to an opportunity cost of not attempting to improve a poor model quality model. Methods to improve model quality involve explicit calibration overrides in parallel to executive and optimizing control functions. Another method augments the optimization cost function with a measure of opportunity cost, or, alternatively, the cost of not having a sufficiently accurate model.

An example of a preferred embodiment of including opportunity costs is explained with reference to FIG. 15A to FIG. 15D. The figures show exemplary level curves of partial cost functions, wherein a weighted sum of the partial cost functions is the total cost function to be used in the optimization. Axes $C_1$ and $C_2$ represent control variables of two environmental actuators for illustrative purposes. Partial cost functions increased from level curve to level curve along arrows shown.

Figure 15:
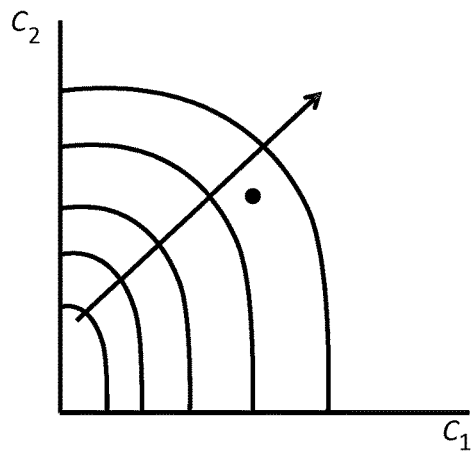
FIGS. 15A-15D show exemplary contour graphs of total cost of two control variables, accounting for opportunity costs, according to an embodiment of the present invention.
Figure 15:
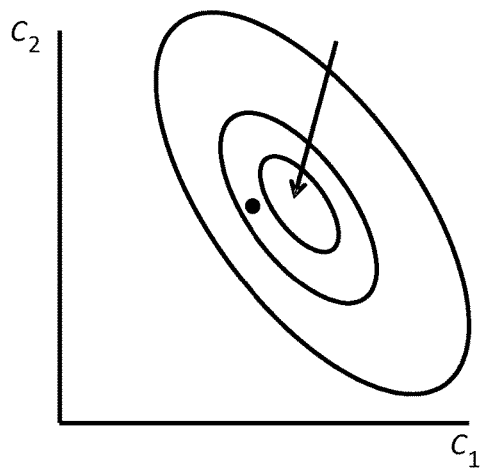
Figure 15:
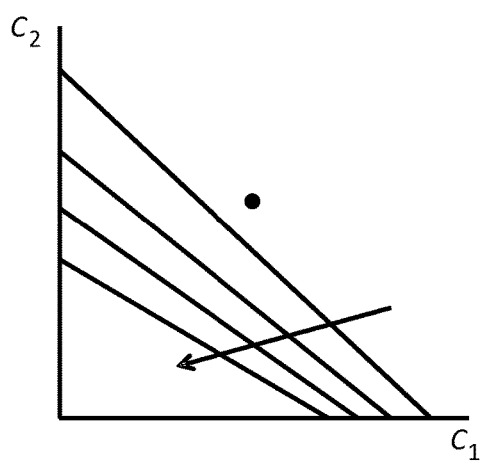
Figure 15:
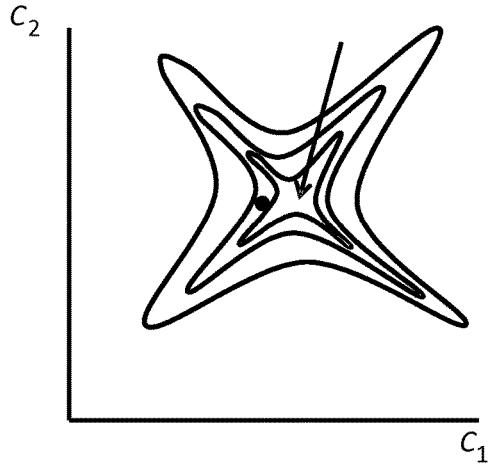

FIG. 15A shows an exemplary energy cost function where level curves with higher cost are associated with more energy use by the environmental actuators.

FIG. 15B shows an exemplary threshold violation cost function where level curves with higher cost are associated with a higher likelihood of predicted threshold violation, wherein the prediction is based on a current model and model quality.

FIG. 15C shows an exemplary opportunity cost function where high cost represents better model quality, i.e., where the partial opportunity cost function favors areas that have poorer model quality.

FIG. 15D shows an opportunity cost function that favors certain directions in control variable space over others. This type of cost function is advantageous if it is preferred that at most one or few control variables do large excursions into unknown territory due to optimization. The results may be similar to a calibration override on the same control variable or combination of control variables.

This type of optimization is also motivated by the fact that while each control variable contributes to the partial and/or total cost function(s), the relative contribution of each control variable diminishes with the number of environmental actuators. Especially in a large system with 10, 20 or 40 environmental actuators, or even more (not atypical for a data center), if one actuator control variable undergoes a large excursion as a result of optimization and/or calibration override, the total cost may only be marginally affected. With the executive controller in the decision engine continuing to provide control decisions for primary control goals, and with sufficient redundancy in the data center, a calibration override and/or an excursion driven by an opportunity cost function will not affect the primary partial cost function (often actuator energy usage) value by much.

Optimization methods for finding optimal solutions with respect to an augmented cost function are known in the art.

Finally, one can address case 5 in the following manner. It is advantageous to visualize, preferably by way of a colored or structured map overlaid over an architectural plan of a controlled environmental space (e.g., a floor plan), the supervisory system's state of knowledge about the environmental space. For example, a color-coded map could represent the extent of a CRAC's influence over all environmental sensors in the environmental space, while the density of an overlaid crosshatch may express the reliability of the influence color map. The user could then expect that the supervisory controller over time will take actions to improve the map areas that are marked as less reliable than other area. The Fog of War visualization technique that is sometimes used in strategy games can also be used for that purpose; regions where model quality is relatively lower or is based on comparably older data is faded out.

It is advantageous to apply some of the same visualization techniques to the rendering of before/after or what-if situations. Specifically, the current state of the environmental space can be contrasted with a predicted state of the environmental space, or two predicted states that are expected to result from different control decisions can be contracted against each other. The visualization is then used to express the confidence where a comparison is reliable.

III. Computer System

Figure 16:
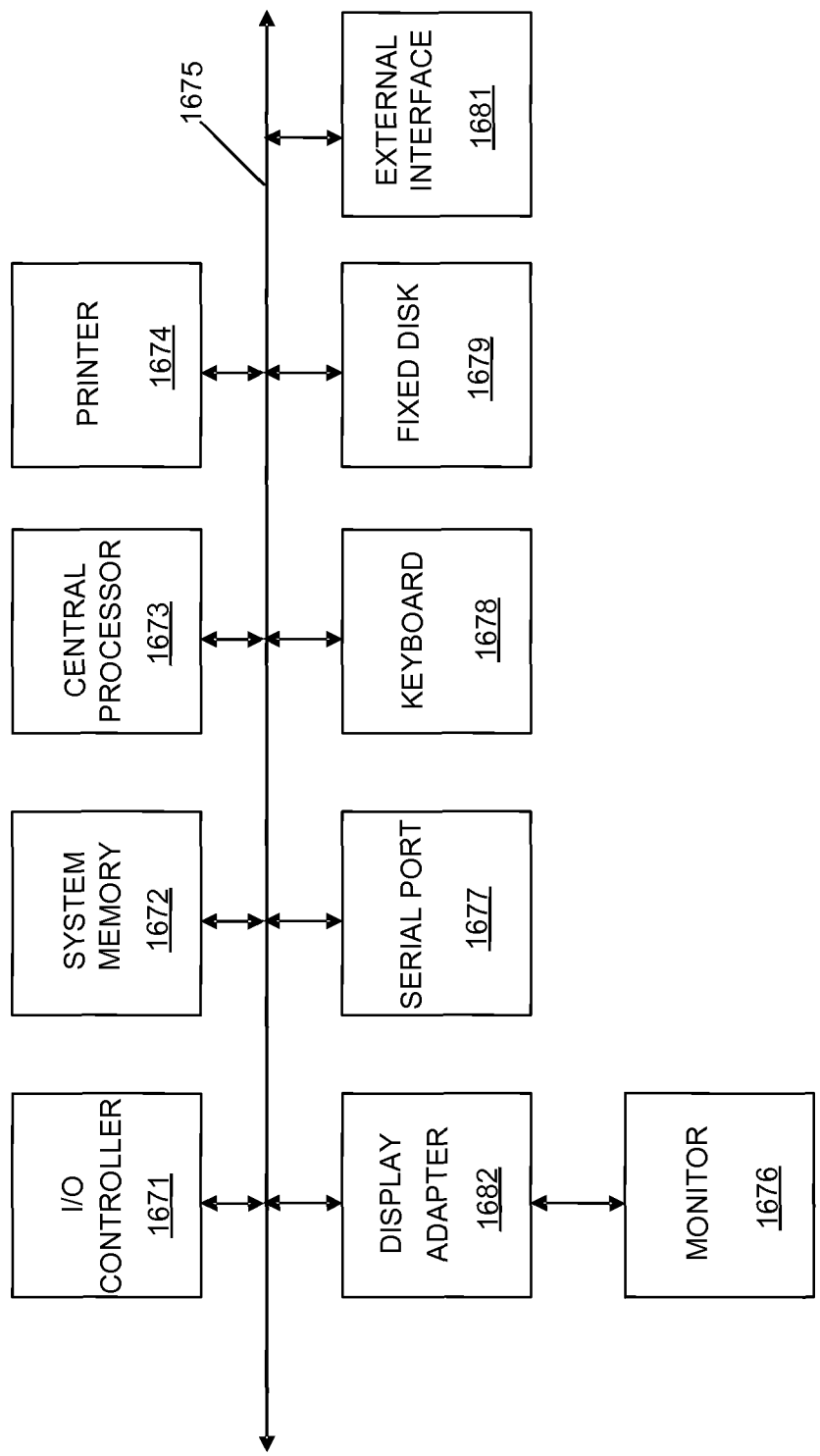
FIG. 16 shows a block diagram of an exemplary computer apparatus usable with systems and methods according to embodiments of the present invention.

Any of the computer systems mentioned herein may utilize any suitable number of subsystems. Examples of such subsystems are shown in FIG. 16 in computer apparatus 1600. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 16 are interconnected via a system bus 1675. Additional subsystems such as a printer 1674, keyboard 1678, fixed disk 1679, monitor 1676, which is coupled to display adapter 1682, and others are shown. Peripherals and input/output (I/O) devices, which couple to I/O controller 1671, can be connected to the computer system by any number of means known in the art, such as serial port 1677. For example, serial port 1677 or external interface 1681 (e.g. Ethernet, Wi-Fi, etc.) can be used to connect computer system 1600 to a wide area network such as the Internet, a mouse input device, or a scanner. The interconnection via system bus 1675 allows the central processor 1673 to communicate with each subsystem and to control the execution of instructions from system memory 1672 or the fixed disk 1679, as well as the exchange of information between subsystems. The system memory 1672 and/or the fixed disk 1679 may embody a computer readable medium. Any of the values mentioned herein can be output from one component to another component and can be output to the user.

A computer system can include a plurality of the same components or subsystems, e.g., connected together by external interface 1681 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. The computer readable medium may record the data in a non-transitory physical medium. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method of updating an influence model of an environmental maintenance system that includes a plurality of environmental maintenance modules and a plurality of sensors, each sensor measuring a value of a corresponding physical condition of an environment, each module including one or more actuators, the method comprising:

running the environmental maintenance system in a first production mode that uses the influence model to determine operation levels of the actuators by:
measuring sensor values of the sensors; and
determining first operation levels of the actuators that optimize a first cost function such that predicted sensor values do not exceed a threshold, wherein the predicted sensor values are determined using the influence model based on the first operation levels of the actuators;

identifying an event indicating a second production mode in which the influence model is updated, wherein an operation level of at least one of the actuators is varied as part of an update procedure of the second production mode; and running the environmental maintenance system in the second production mode by:
selecting a first actuator among the actuators for calibration override, wherein the calibration override includes:
constraining an operation level of the first actuator to vary according to a first predetermined trajectory, wherein the first predetermined trajectory overrides an operation level determined for the first actuator using the influence model, constraining including:
assigning a first predetermined value to the first actuator at a first predetermined time, the first predetermined trajectory including the first predetermined value at the first predetermined time; and
assigning a second predetermined value to the first actuator at a second predetermined time, the first predetermined trajectory including the first predetermined value at the first predetermined time and the second predetermined value at the second predetermined time;
determining second operation levels of a subset of the actuators that optimize a second cost function based on measured sensor values, the subset not including the first actuator; and
updating the influence model based on the first predetermined trajectory, the second operation levels, and measured sensor values.

2. The method of claim 1, wherein identifying the event includes:
determining a first confidence score of the influence model associated with the first actuator;
selecting the first actuator among the actuators for the calibration override based on the first confidence score being lower than a first threshold.

3. The method of claim 2, wherein the first confidence score is based on a length of time that a variation in the operation level of the first actuator is less than a threshold.

4. The method of claim 1, wherein the first predetermined trajectory changes linearly over time.

5. The method of claim 1, wherein the event indicating the second production mode is periodically scheduled or is an unchanged operation level in one of the actuators for more than a specified length of time.

6. The method of claim 1, wherein the second operation levels of the subset of the actuators are selected to maintain physical conditions within acceptable ranges of values.

7. The method of claim 1, wherein updating the influence model comprises:
receiving a time sequence of data comprising values of the sensors and the actuators at a plurality of first time instants;
using the values of the sensors and actuators at the plurality of first time instants to predict a value of a selected sensor at a second time instant that is subsequent to the plurality of first time instants;
comparing the predicted value of the selected sensor at the second time instant to an actual value of the selected sensor at the second time instant; and
updating model parameters based on the comparing.

8. The method of claim 7, wherein updating the model parameters uses a least squares technique.

9. The method of claim 1, further comprising:
exiting the second production mode in response to a sensor value exceeding a corresponding threshold.

10. The method of claim 1, wherein the first predetermined value is equal to the second predetermined value.

11. A computer product comprising a non-transitory computer readable medium storing a plurality of instructions that when executed cause a computer system to update an influence model of an environmental maintenance system that includes a plurality of environmental maintenance modules and a plurality of sensors, each sensor measuring a value of a corresponding physical condition of an environment, each module including one or more actuators, the instructions comprising:
running the environmental maintenance system in a first production mode that uses the influence model to determine operation levels of the actuators by:
measuring sensor values of the sensors; and
determining first operation levels of the actuators that optimize a first cost function such that predicted sensor values do not exceed a threshold, wherein the predicted sensor values are determined using the influence model based on the first operation levels of the actuators;
identifying an event indicating a second production mode in which the influence model is updated, wherein an operation level of at least one of the actuators is varied as part of an update procedure of the second production mode; and
running the environmental maintenance system in the second production mode by:
selecting a first actuator among the actuators for calibration override, wherein the calibration override includes:
constraining an operation level of the first actuator to vary according to a first predetermined trajectory, wherein the first predetermined trajectory overrides an operation level determined for the first actuator using the influence model, constraining including:
assigning a first predetermined value to the first actuator at a first predetermined time, the first predetermined trajectory including the first predetermined value at the first predetermined time and
assigning a second predetermined value to the first actuator at a second predetermined time, the first predetermined trajectory including the first predetermined value at the first predetermined time and the second predetermined value at the second predetermined time;
determining second operation levels of a subset of the actuators that optimize a second cost function based on measured sensor values, the subset not including the first actuator; and
updating the influence model based on the first predetermined trajectory, the second operation levels, and measured sensor values.

12. An environmental maintenance system comprising:
a plurality of sensors, each sensor measuring a value of a corresponding physical condition of an environment,
a plurality of environmental maintenance modules, each module including one or more actuators; and
a supervisory controller that is communicatively linked with the modules, sensors, and the computer product of claim 11, and that is configured to execute the plurality of instructions of the computer product of claim 11.

13. The computer product of claim 11, wherein identifying the event includes:
determining a first confidence score of the influence model associated with the first actuator;
selecting the first actuator among the actuators for the calibration override based on the first confidence score is being lower than a first threshold.

14. The computer product of claim 11, wherein updating the influence model comprises:
receiving data of values of the sensors and the actuators at a plurality of first time instants;

using the values of the sensors and actuators at the plurality of first time instants to predict a value of a selected sensor at a second time instant that is subsequent to the plurality of first time instants;

comparing the predicted value of the selected sensor at the second time instant to an actual value of the selected sensor at the second time instant; and updating model parameters based on the comparing.

15. A method of updating an influence model of an environmental maintenance system that includes a plurality of environmental maintenance modules and a plurality of sensors that measure a value of a physical condition of an environment, each module including one or more actuators, the method comprising:

running the environmental maintenance system in a first production mode that uses the influence model to determine operation levels of the actuators by:

measuring sensor values of the sensors; and determining first operation levels of the actuators that optimize a first cost function such that predicted sensor values do not exceed a threshold, wherein the predicted sensor values are determined using the influence model based on input levels of the actuators;

identifying an event indicating a second production mode in which the influence model is updated, wherein identifying the event includes:

determining a first confidence score of the influence model associated with the one or more actuators;

selecting a first actuator among the actuators for calibration override based on the first confidence score for the first actuator being lower than a first threshold, and varying an operation level of the first actuator according to a predetermined trajectory as part of the calibration override, wherein the predetermined trajectory overrides an operation level determined for the first actuator using the influence model, varying including:

assigning a first predetermined value to the first actuator at a first predetermined time, the predetermined trajectory including the first predetermined value at the first predetermined time; and assigning a second predetermined value to the first actuator at a second predetermined time, the predetermined trajectory including the first predetermined value at the first predetermined time and the second predetermined value at the second predetermined time.

16. The method of claim 15, wherein updating the influence model comprises:

receiving a time sequence of data comprising values of the sensors and the actuators at a plurality of first time instants;

using the values of the sensors and actuators at the plurality of first time instants to predict a value of a selected sensor at a second time instant that is subsequent to the plurality of first time instants;

comparing the predicted value of the selected sensor at the second time instant to an actual value of the selected sensor at the second time instant; and updating model parameters based on the comparing.

17. The method of claim 15 wherein, in the case that during the varying of the operation level of the first actuator according to the predetermined trajectory a sensor value exceeds a threshold, exiting the second production mode.

18. A computer product comprising a non-transitory computer readable medium storing a plurality of instructions that when executed cause a computer system to update an influence model of an environmental maintenance system that includes a plurality of environmental maintenance modules and a plurality of sensors, each sensor measuring a value of a corresponding physical condition of an environment, each module including one or more actuators, the instructions comprising the method of claim 15.

19. An environmental maintenance system comprising:

a plurality of sensors, each sensor measuring a value of a corresponding physical condition of an environment, a plurality of environmental maintenance modules, each module including one or more actuators, and a supervisory controller that is communicatively linked with the modules, sensors, and the computer product of claim 18, and that is configured to execute the plurality of instructions of the computer product of claim 18.

20. The environmental system of claim 19, wherein, in the case that during the varying of the operation level of the first actuator according to the predetermined trajectory a sensor value exceeds a threshold, the supervisory controller causes the environmental maintenance system to exit the second production mode.

* * * * *